United States Patent
Schutzman et al.

(12) 
(10) Patent No.: US 6,505,216 B1
(45) Date of Patent: Jan. 7, 2003

(54) METHODS AND APPARATUS FOR BACKING-UP AND RESTORING FILES USING MULTIPLE TRAILS

(75) Inventors: Neil F. Schutzman, Marlborough, MA (US); Pichai Swaddipong, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/411,612

(22) Filed: Oct. 1, 1999

(51) Int. Cl.$^7$ .......................... G06F 17/30; G06F 12/00
(52) U.S. Cl. .................... 707/204; 707/202; 711/162
(58) Field of Search ............................... 707/201–204, 707/6–8, 1–2, 100–102, 205; 714/7, 3, 11; 709/248; 711/4, 100, 120, 150, 162, 163

(56) References Cited

U.S. PATENT DOCUMENTS

| | | | |
|---|---|---|---|
| 5,671,350 A | * | 9/1997 | Wood ........................... 714/15 |
| 5,673,381 A | * | 9/1997 | Huai et al. ................... 345/848 |
| 5,857,208 A | * | 1/1999 | Ofek ........................... 707/204 |
| 6,003,044 A | * | 12/1999 | Pongracz et al. ........... 707/204 |
| 6,345,282 B1 | * | 2/2002 | Minyard ...................... 707/203 |

* cited by examiner

Primary Examiner—Alford W. Kindred
(74) Attorney, Agent, or Firm—Chapin & Huang, L.L.C.; Barry W. Chapin, Esq.

(57) ABSTRACT

Mechanisms and techniques are disclosed that provide the ability to backup and restore a file between a backup server and a data storage system using multiple trails of data for the same file. Within the data storage system, the file is generally stored as a series of data portions spread across multiple storage devices such as disk. The file may be stored, for example, within a volume. In the backup operation of the invention, a discover phase determines which respective data portions of the file (e.g., partitions) are stored upon which respective storage devices (e.g., disks) of a plurality of storage devices. The system then designates individual respective backup devices (e.g., tapes) of a plurality of backup devices to be used for backing-up respective individual ones of the data portions of the file that are stored on respective storage devices. Next, the system concurrently backs up at least two respective data portions of the file to different respective backup devices for which those data portions are designated, such that at least two respective data portions of the file are backed-up to respective backup devices in parallel. The restore operation operates in a similar manner by determining which respective data portions (e.g., backup images) of the file are stored upon which respective backup devices (e.g., tapes) of a plurality of backup devices. The system then designates individual respective portions of storage devices of a plurality of storage devices to be used for storing respective individual ones of the data portions of the file that are stored on respective backup devices. Next, the system concurrently restores at least two respective data portions of the file to different respective storage devices for which those data portions are designated, such that at least two respective data portions of the file are restored to respective storage devices from respective backup devices in parallel. By treating portions of a file as separate backup work items, each portion may be provided as an independent stream or trail of data to or from the backup server, thus decreasing the time required to backup or restore a file.

28 Claims, 9 Drawing Sheets

MULTIPLE TRAIL FILE BACKUP

PREPARATION PHASE

EXECUTION PHASE

MULTIPLE TRAIL FILE RESTORE

METHODS AND APPARATUS FOR BACKING-UP AND RESTORING FILES USING MULTIPLE TRAILS

FIELD OF THE INVENTION

The present invention relates generally to data storage and data backup systems, and more particularly, to systems and techniques which allow a file to be backed-up and restored between a data storage system and a backup server using concurrently transmitted trails of data from the same file.

BACKGROUND OF THE INVENTION

The ever increasing popularity in the use of computer networks and computerized data processing systems for both recreational and commercial use has created vast amounts of data that must be stored. To serve this need, data storage system providers have developed mass data storage systems that use large high speed disk arrays to store and access data. In a typical data storage system using modern disk array technology, there are many individual physical storage devices, such as hard disk drives (disks), which provide storage, access, and management of the data. Remote computer systems such as hosts on a computer network that require access (read and/or write capability) to the data stored in the data storage system generally reference the data as one or more files within a filesystem.

Software applications that execute on the remote computer systems are generally responsible for generating the data that gets stored in the files within a data storage system. For example, a software application such as Microsoft Exchange produced by Microsoft Corporation of Redmond Wash. (Microsoft and Microsoft Exchange are trademarks of Microsoft Corporation) can be used to create and manage a large database of information that is stored as a single file within a data storage system. Depending upon the amount of data that is stored in the database, it is not uncommon for the size of the file containing the data to become quite large and exceed, for example, many tens of gigabytes in size.

A single hard disk within a data storage system cannot typically provide enough storage capacity by itself to store files and/or filesystems that grow to such large capacities. Accordingly, data storage systems often provide logical storage entities called "volumes." An administrator of the data storage system configures individual volumes during an initial data storage system setup procedure. A single volume of data, often referred to as a "logical volume," provides a mechanism to associate many portions of different individual disks (or many entire disks ) together as a contiguous amount of available data storage space. A volume allows a large file that exceeds the size of any one hard disk drive to be stored across different portions of the disks that make up the volume in the data storage system. A process called a Logical Volume Manager (LVM) typically executes on a host and interfaces with process(s) and/or control circuitry within the data storage system to manage associated disks and data stored within volumes. The Logical Volume Manager also provides an interface for computer application programs to access (read and/or write) the files stored within the disks associated with the volume.

A portion of a hard disk drive that can be included within a volume is typically called a partition, and a hard disk may contain more than one partition. For example, during a disk configuration process, an administrator might "partition" a single ten gigabyte disk into two non-overlapping five gigabyte partitions. It is possible to configure the entire capacity of a single disk as a one partition (e.g., one ten gigabyte hard disk may be partitioned as one ten gigabyte partition). Each partition on a hard disk includes disk extent information which indicates how large the partition is (e.g. how many gigabytes) and where (e.g. between what disk addresses) the partition exists on the disk.

Volumes within a data storage system are thus a set of one or more disk partitions within a data storage system, presented by an LVM process to software applications on host(s) as a contiguous amount of storage space available to store files. As a specific example, a one hundred gigabyte volume may be comprised of twenty, five-gigabyte partitions, with each partition existing on a different disk.

Generally, two types of volumes exist in data storage systems: concatenated volumes and striped volumes. The specific type of a volume reflects how data is arranged for storage across the disk partitions that make up the volume. In concatenated volumes, data is stored sequentially. Thus, if a concatenated volume is composed of three disk partitions which are distributed across various disk drives on the data storage system, as a remote computer system stores (i.e. writes) more and more data to the volume, the LVM first will fill the first partition in the concatenated volume with data, followed by the second partition, and then the third partition. The LVM thus fills partitions in a concatenated volume from first to last in a sequential manner.

The LVM treats striped volumes somewhat differently than concatenated volumes. A striped volume also is a set of partitions distributed across one or more disks in a data storage system. Striped volumes have data written in incremental and equal amounts to each partition in the volume, a little at a time (whereas concatenated volumes fill one partition completely before beginning to fill the next in the volume). Accordingly, when storing data to a striped volume, the LVM writes small portions or segments of data evenly, to each disk partition associated with the striped volume. As such, each partition in the striped volume is filled equally, a little bit at a time. If the partition layout of a striped volume is diagramed, the data appears to be striped across each partition, hence the name striped volume. When using striped volumes, data is essentially spread evenly across each partition as the volume fills-up.

Referring now to another area related to the invention, it is quite common for computer systems to perform periodic backups of files stored in a data storage system. Backing-up files typically involves transferring a copy of the file stored in the disks within a data storage system to another medium, such as magnetic tape. Backing-up files protects against data loss in the event of disk or data storage system failures.

In conventional backup systems, backups of an entire volume are typically performed on a file by file basis. That is, each file within a volume is backed-up to a tape drive in sequential order. Thus, if a volume contains three files A, B and C, file A might be backed up to tape first, followed by file B and then by file C. During a conventional backup operation, data storage systems provide the data from each file for backup purposes from beginning to end, just as if each file were being sequentially loaded in its entirety into memory in a host computer system. For example, to backup file A, the LVM starts by reading data from the beginning of file A, and then continually reads and streams the data to the backup storage system (e.g., a tape drive unit) until the end of the A file is reached. Files B and then C would be performed thereafter in successive order. If the LVM uses concatenated volumes, the LVM begins reading file A from the first partition of the volume containing this file, and if file A spans more than one partition, once the LVM completes streaming data for file A from the first partition storing file A, the LVM proceeds to the next (i.e. second) partition that stores the next portion of file A, and so on until the file is completely backed up from the concatenated volume.

To backup a file stored on a striped volume, the LVM sequentially reads small segments of data from each partition. The first segment of data read from each of the first to the last partition in the volume forms the first stripe of the striped volume. When the first stripe has been read, the LVM returns to the first partition to begin reading of the second stripe, and the process repeats by reading a small segment of data from each partition until the second strip is completely read. The process continues until the LVM has read all of the data for the entire file from the striped partition. Note that in striped volumes, just as in concatenated volumes, the LVM sequentially reads and streams the data from a single file stored on a striped volume to the backup device from beginning to end. When the backup of file A is completed, the backup process then repeats for files B and C, at which point the backup is complete and files A, B and C are stored to magnetic tape.

More than one tape might be required to store the contents of files A, B and C, depending upon each file's size and the total size of all of the data to be backed-up. However, each file is read from the data storage system as a single stream or "trail" of data from the beginning of the file to its end, and each file is stored on tape as a single contiguous backup image of the file. For example, a single tape might be able to store up to forty-two gigabytes of data. If file A is fifty gigabytes, and files B and C are only 10 gigabytes each, two tapes are required to backup files A, B and C. During execution of a conventional backup process, the backup device (e.g. tape drive) sequentially reads file A, placing the first forty-two gigabytes onto the first tape. Then, after the second tape is mounted, the remaining eight gigabytes of file A are stored to the beginning of the second tape. Thereafter, the backup device sequentially reads file B, storing it on the next ten gigabytes of tape 2, followed by file C which is backed up to the next ten gigabytes of tape 2. In this manner, the backup device stores each file by receiving a single data stream.

To restore a file that has been previously backed up to tape, a conventional restore operation is generally performed in reverse order of the prior art backup operation. During a restore, a backup system mounts the tape containing the beginning of the file to be restored and reads and streams data from the backup image of the file on tape to the LVM which places the data onto storage in the data storage system. The stream of data is received as a single data trail from the beginning to the end of the file being restored. If the file on tape was originally stored in a concatenated volume, then the LVM simply begins writing the stream of data to a partition within the volume to which the file is being restored in the data storage system. Once the first partition fills up, the LVM advances to the next partition of the concatenated volume and continues to write the stream of data. This process continues until the file is completely restored. If the file is restored to a striped volume, then the LVM sequentially writes small predetermined segments of the data stream to each partition as they arrive in a serial fashion. When the last partition of the volume is read for the first time, the first stripe of data for the file is complete and the LVM returns to write the next segment received to begin the second stripe on the volume. The LVM thus controls the striping of the file to various partitions during the restore operation, just as if the data were being received from an application creating (i.e., writing to disk) the file in its entirety for the first time.

SUMMARY OF THE INVENTION

Prior art backup processes that use conventional techniques to backup and restore files to and from a data storage system suffer from a number of deficiencies. Most notably, conventional backup solutions backup entire individual files, which may be quite large in size, onto tape as a single complete backup file image. That is, each file in a prior art backup system is backed up as a singular work item and resides on the backup medium (e.g. tape) as a sequentially contiguous file from start to end. There are no provisions in prior art backup (or restore) systems to backup a single file as a group of smaller entities or portions. Accordingly, backup operations can take inordinate amounts of time to complete, especially for very large files.

For example, a typical data storage system can provide a stream of data from a single hard disk drive at a speed of approximately ten megabits per second. Interestingly, if two streams of data are read from the same disk, the speed of each trail drops dramatically down to about two and a half megabits per second, due to the overhead involved in seeking data on the disk for both streams. Since prior art backup systems backup a file from the beginning to the end of the file as a single stream or trail of data, the fastest data rate that can be provided for that singular stream is ten megabits per second (i.e., the data rate of data being read from the hard disk using one stream). In other words, since the file is backed up sequentially from start to end, only one stream of data is available to provide data from the file to the backup medium.

Similarly, a commonly used backup mechanism such as a magnetic tape drive is relatively slow, and can only accept and write data at a rate of approximately five to seven megabits per second. When backing up instances of large files, the speed of the backup might be further limited by the speed of the tape drive accepting the single stream of data for a file. More advanced backup servers might provide many tape drives that can be used simultaneously. However, since individual files are backed up with a single stream of data, even with multiple files being backed up to different tape drives at the same time, the backup operation is restricted to taking at least as long as the time required to backup the largest file using one stream of data for that file. Thus, multiple tape drives that can be run in unison might be helpful to speed the backup process of different files (e.g., with each tape drive backing up a different file), but the problem of lengthy backup time still remains when one file is very large and is limited to being backed up with the single stream of data.

Similar problems exist in prior art restore systems. When doing a prior art restore of a file, since the file was backed up as one large sequential stream or trail of data, the restore system must read the file from the backup tape device in a similar manner. Only one stream of data is thus available at any point in time for any individual file being restored from a backup device to a data storage device. Just to restore a large file, the restore operation may take many minutes or hours to complete. This is unacceptable in highly reliable computer data processing systems that require lost data to be restored quickly.

The present invention is based in part on the observation of the aforementioned problems with prior art backup and restore systems and does much to overcome and minimize such problems. The present invention provides a system including mechanisms and techniques to allow a file to be backed up from a data storage system to a backup device using multiple trails or streams of data. In general, the system of the invention allows a data storage system to concurrently or simultaneously provide many streams of data for the same file during a backup operation. Each data stream corresponds to data read from a different portion of the file. The invention thereby allows the entire operation of backing up a file to be done in portions that are concurrently backed up in parallel with each other. This significantly reduces the time required to backup the file.

In a similar manner, the invention also provide mechanisms and techniques to restore, from a backup device to a data storage system, a single file using multiple trails or streams of data. Since portions of the file are received over different streams of data that are transferred to the data storage system in parallel with each other, restoring a large file in this manner takes considerably less time than conventional prior art file restoring techniques.

More specifically, according to one aspect of the invention, a system of the invention provides a technique for backing up a file. The system implements the technique by first determining which respective data portions of the file are stored upon which respective storage devices of a plurality of storage devices. In an example system configuration, the data portions of the file are partitions of the storage devices, which are hard disk drives within a data storage system. The system then designates individual respective backup devices of a plurality of backup devices to be used for backing-up respective individual ones of the data portions of the file that are stored on respective storage devices. The backup devices in a typical configuration of the invention are tape drives using tape media for storing the backup data. The process of designating thus matches or pairs-up different data portions of the file to respective different tapes on the tape drives (i.e., backup devices). The technique of the invention then concurrently backs-up at least two respective data portions of the file (e.g., two different partitions) to different respective backup devices for which those data portions are designated, such that the at least two respective data portions of the file are backed-up to respective backup devices in parallel. For instance, with two tape drives, two data portions of the same file could be backed up at the same time. In this manner, the invention is able to simultaneously backup different data portions of the same file in a concurrent fashion, thus saving significant amounts of time when backing up the file.

In somewhat more detail, to determining which respective data portions of the file are stored upon which respective storage devices, the system of the invention performs the operations of obtaining an identity of a volume that stores the respective data portions of the file. This may done, for instance, by querying the Logical Volume Manager. Next, the system obtains, from the volume, disk extent information for each respective data portion of the file, the disk extent information identifying, for each respective data portion, a respective storage device that stores the data portion and a size and placement of the data portion on the storage device. Once the size and placement of each data portion of the file are known, the system creates a list of backup work items, each backup work item in the list corresponding to one of the respective data portions of the file to be backed-up and including the disk extent information for that respective data portion. Essentially, as will be discussed in more detail, a list of backup work items indicates what data portions from a hard disk are to be written to what tape drives in the backup storage system.

The file to be backed-up may be comprised of potentially many different data portions on different disk partitions. To create a list of backup work items, the system of the invention in one arrangement assigns a unique respective backup file name for each respective data portion of the file. The system then associates the disk extent information (e.g., size, placement, etc.) for each respective data portion of the file to the unique respective backup file name assigned to that respective data portion. Accordingly, in this particular arrangement of the invention, the list of backup work items contains a new file name (which is essentially treated as a file to be backed up, in and of itself) for each data portion of the file, and for each new file name, the system assigns the extent information for a respectively associated data portion as well as a respective backup device (e.g. tape drive) to the file name.

In one arrangement of the system of the invention, to designate which individual respective backup devices (e.g., tapes) of a plurality of backup devices are to be used for backing-up respective individual ones of the data portions (e.g., partitions), the system sequentially selects and assigns backup work items from the list of backup work items to a backup device sequentially selected from the plurality of backup devices. In a preferred arrangement, backup work items that correspond to data portions that reside on a common storage device (e.g., two partitions of the same file on a single hard disk drive) are assigned to the same backup device (e.g. tape). In a more specific implementation of this technique, the system assigns respective data portions of the file that are stored on different storage devices to different respective backup devices, such that during the operation of concurrently backing-up the at least two respective data portions of the file, no two data portions that reside on a common storage device are read at the same time.

This technique ensures that if two data partitions which store the single file to be backed up are on the same disk, then those partitions will be streamed to the same tape drive but at different times (e.g., one after another). Or in other words, the technique of concurrently backing-up at least two respective data portions of the file concurrently backs up a plurality of data portions of the file in parallel to a plurality of respectively assigned backup devices, such that no two data portions that exist on a common storage device are backed up in parallel.

One arrangement of the invention sequentially selects and assigns backup work items to a backup device by determining if a data portion corresponding to a currently selected backup work item is stored on the same storage device as a backup work item that has been previously selected and that has been assigned to a backup device. If this is the case, then the system assigns the currently selected backup work item to the same storage device as the backup work item previously selected. By repeating the steps of sequentially selecting, assigning and determining in a round-robin manner until all backup work items have been assigned to a specific respective backup device, the system of the invention can ensure that data portions from the same disk are paired-up or assigned for backup (e.g., in the backup work item list) to the same tape. Once the backup work item list is created, the technique of the invention concurrently backs up a plurality of data portions of the file (one per backup work item) in parallel to a plurality of respectively assigned backup devices, while ensuring that no two data portions that exist on a common storage device are backed up in parallel at the same time.

According to another arrangement of the system of the invention, if a tuning file (to be explained later) is available which specifies which data portions are to be backed-up to which backup devices, the system uses assignments between backup work items and backup devices as specified in the tuning file. If no tuning file is present however, the system performs the previous operations of sequentially selecting, and assigning, and determining until all backup work items have been assigned to a respective backup device.

To perform the operation of concurrently backing-up each data portion, the technique of the invention concurrently performs, for each respective backup device having at least one designated data portion to backup, a backup operation of one data portion designated to be backed-up by that backup device. Once the invention detects completion of the backup operation of each respective backup device, the system determines if other designated data portions remain to be backed up, and if so, repeats the techniques explained above of concurrently performing a backup operation and detecting completion of the backup operation for any designated data portions that remain to be backed up.

During the concurrent backup operation of the system of the invention, the system receives a first stream of data from a first data portion of the file stored within a first data storage device within the data storage system and writes the first stream of data to a first respective backup device for which the first data portion is designated. Concurrently therewith, the system also receives a second stream of data from a second data portion of the file stored within a second data storage device within the data storage system and writes the second stream of data to a second respective backup device for which the second data portion is designated. The operations of receiving the first stream of data and receiving the second stream of data are performed concurrently such that different respective data portions of the file are simultaneously received and written to different backup devices in the data backup system. As indicated above, this vastly improves file backup times.

These techniques may be applied to any size file stored on any number of disks in any number of data portions, though benefits are more pronounced for large files. According to one arrangement of the invention, prior to backing up the data portions, the system detects if the file to be backed-up exceeds a predetermined threshold which indicates that a multiple trail file backup is to be performed. If such a determination is made, the system then performs the steps of determining, designating and concurrently backing-up as outlined above. The predetermined threshold may be, for example, an amount of time required to completely backup the file using a non-multiple trail file backup method or may be a maximum total size of the backup file. The file to be backed up may be included in a list of files to be backed up by the backup server and the system may perform the procedure outlined above for each file within the list of files.

Another technique encompassed within the system of the invention provides a technique for preparing a list of backup work items for a backup server. The list contains a list of backup work items (one per data portion of a file) to be backed-up. To create such a list, the technique retrieves a list of files to be backed up, and, for each single file in the list of files, determines if the single file exceeds a predetermined size threshold. If the size threshold is met, the system employing the technique determines if the single file meets criteria for a multiple trail file backup. The criteria may be, for example, that the file is stored as at least two distinct data portions on two distinct storage devices such as hard disks, and that there are at least two distinct backup devices such as tape drives to perform a backup operation once the list of backup work items is complete. If the system determines that the size threshold and multiple trail criteria are met, the technique of the system obtains an identity of a volume that stores respective data portions of the file and then obtains, from the volume, disk extent information for each respective data portion of the file. The disk extent information identifies, for each respective data portion, a respective storage device that stores the data portion and a size and placement of the data portion on the storage device. The technique of the system of the invention then creates a list of backup work items, with each backup work item in the list corresponding to one of the respective data portions of the file to be backed-up and each including the disk extent information for that respective data portion. In this manner, each data portion of the file can be treated, according to this technique of the system of the invention, as a separate work item during a subsequent backup process.

The invention also includes a method of providing data from a data storage system to a backup server. In an arrangement supporting this method, the system provides, as output from the data storage system, a first stream of data from a first portion of a file stored on a first data storage device within the data storage system. The system also provides, as output from the data storage system, a second stream of data from a second portion of the file stored on a second data storage device within the data storage system. The operations of providing a first stream of data and providing a second stream of data are performed concurrently between a backup client program and a backup server program such that different respective data portions of the file are simultaneously provided as output from the data storage system to the backup server. This aspect of the invention allows multiple trails or streams of data to be read from the data storage system that are all part of the same file to be backed up, thus increasing the efficiency of the data storage system in providing data from a file to a backup server.

The system of the invention also provides a method for restoring a file using multiple trails provided from backup devices, such as tape drives, from within the backup server. According to this technique, the system determines which respective data portions (i.e., different backup images on tape of different partitions from disk(s) that originally stored the file) of the file are stored upon which respective backup devices (i.e., tape drives) of a plurality of backup devices (e.g., a set of tape drives in a backup server). The system then designates individual respective portions (i.e., partitions) of storage devices (i.e., hard disk drives or other storage media) of a plurality of storage devices to be used for storing respective individual ones of the data portions of the file that are stored on respective backup devices. The system then concurrently restores at least two respective data portions (i.e., backup file images on different tapes) of the file to different respective storage devices (i.e., to partitions on respective disks) for which those data portions are designated, such that at least two respective data portions of the file are restored to respective storage devices from respective backup devices in parallel.

The system of the invention itself includes a backup server computer system comprising a backup client interface, a backup device interface coupled to a plurality of backup devices, a processor, and an interconnection mechanism coupled to the backup client interface, the storage device interface and the processor. A memory is provided and is coupled to the interconnection mechanism. The memory stores a backup server program. The backup server program is executable on the processor to cause the processor to perform the methods and techniques outlined above.

Specifically, in one arrangement, the backup server program determines which respective data portions of a file to be backed-up are stored upon which respective storage devices of a plurality of storage devices accessible by a host backup client. The backup server program designates individual respective backup devices of the plurality of backup devices to be used for backing-up respective individual ones of the data portions of the file that are stored on respective storage devices. Next, the backup server program concurrently backs-up at least two respective data portions of the file to different respective backup devices for which those data portions are designated, such that respective data portions of the file are backed-up to respective backup devices in parallel via the backup server computer system.

The backup server system can also restore files using multiple trails in order to cut down the time required to perform file restore operations. According to this arrangement of the backup server, the backup server program is executable on the processor to cause the processor to determine which respective data portions of a file are stored upon which respective backup devices of the plurality of backup devices. Then, the program designates individual respective portions of storage devices of the plurality of storage devices accessible via the host backup client to be used for storing respective individual ones of the data portions of the file that are stored on respective backup devices. Next, the program causes the processor to concurrently restore at least two respective data portions of the file to different respective storage devices for which those data portions are designated. The concurrent restore is performed such that the at least two respective data portions of the file are restored to respective storage devices accessible to the host backup client from respective backup devices interfaced to the backup server in parallel.

Another arrangement of the backup server comprises a plurality of storage devices and a backup client interface to couple the backup server to at least one host backup client. A processor is provided and is coupled to the plurality of storage devices and to the backup client interface. The processor executes a series of instructions to allow the backup server to backup a single file that is stored as a plurality of data portions across a plurality of storage devices accessible to the host backup client. In this arrangement, each data portion is backed up as a stream of data to a respective backup device and at least two streams of data are received for backup in parallel to the backup server from the host backup client.

Other arrangements of the invention that are disclosed herein include software programs to perform the backup and restore operations summarized above. More particularly, a computer program product is disclosed which has a computer-readable medium including computer program logic encoded thereon as a backup server program for backing up a file. The computer program logic, when executed on at least one processing unit with a backup server, causes the processing unit to perform the operations of backing up and restoring as indicated herein. This arrangement of the invention is typically provided as software on a computer readable medium such as an optical, floppy or hard disk or other such medium such as firmware in a ROM or RAM chip. The software can be installed onto a computer to perform the techniques explained herein. For instance, a backup client computer can install the software which then executes to periodically backup files to the backup server, which also executes one or more software programs that perform the backup server methods of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

General System Operation

Figure 1:
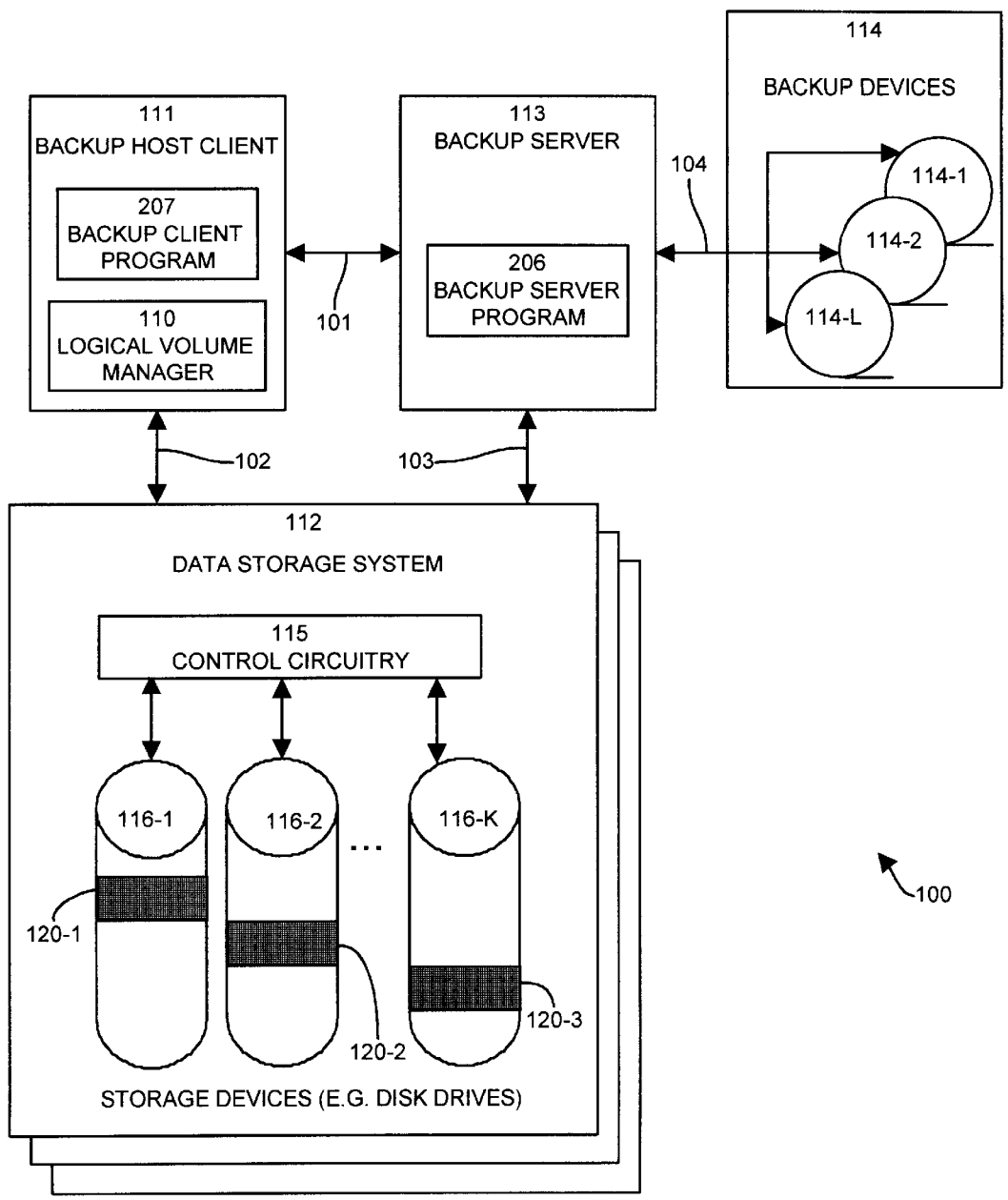
FIG. 1 illustrates an example operating environment and architecture of the invention which includes a data storage system, a backup host client, a backup server and associated backup storage devices that operate in conjunction with each other according to the techniques explained herein.

FIG. 1 illustrates an example configuration of a backup and restore system 100 that operates according to the invention. The system 100 includes an interconnection of a data storage system 112 including storage devices 116 (116-1 through 116-K, where K may be any number greater than or equal to 1) and control circuitry 115, a backup host client 111 including a backup client program 207 and logical volume manager (LVM) 110, a backup server 113 including a backup server program 206, and backup storage devices 114 (114-1 through 114-L, where L may be any number greater than or equal to 1). The example configuration in FIG. 1 is useful in providing a high level description of the fundamentals and operation of the invention which will assist the reader in understanding more detailed arrangements and techniques of the invention that are presented later.

Generally, under normal operation, the backup host client 111, which may be any type of computer system, communicates with the data storage system 112 to access (e.g., read and/or write) data in the form of a file 120. Software applications (e.g., the backup client program 207) that execute on the backup host client 111 typically access data in the data storage system 112 through the Logical Volume Manager (LVM) process 110. The LVM 110 executes on the backup host client 111 in this example and interfaces with processes and/or control circuitry 115 in the data storage system 112 to manage storage and distribution of data, such as the file 120, across the storage devices 116. In this particular example, data associated with the file 120 is divided into data portions 120-1 through 120-3, which are each stored within respective storage devices 116-1 through 116-K. Periodically, such as on a nightly, daily, weekly or other basis, the backup client program 207 executing on the backup host client 111 intercommunicates with the backup server program 206 which executes on the backup server 113 to perform a backup of the file 120 from the data storage system 112. Restore operations (which will be explained in detail later) can also be performed via the invention to obtain a backed up file from the backup devices 114 and deposit the backed up file onto the storage devices 116, according to the techniques of the invention.

General Backup Operation

During a backup operation of a file 120, the system of the invention provides for concurrent transfer of the different data portions (of which there are three in this example) 120-1 through 120-3 of the file 120 using a separate data stream or data trail for each portion (e.g., one stream for data portion 120-1, another trail for portion 120-2 and yet another for portion 120-3) from the storage devices 116 in the data storage system 112 onto respective backup storage devices 114 which are managed by the backup server 113. That is, the invention allows different data portions 120-1 through 120-3 of the same file 120 to each be backed-up at the same time, in a parallel manner, as individual backup work items (to be explained). The backup server 113 stores each data portion 120-1 through 120-3 as a distinct backup image within the backup devices 114 (e.g., on magnetic tapes accessed by tape drives). By concurrently backing-up different data portions (e.g., 120-1 through 120-3) of the same file 120 at the same time, the amount of time required to backup the entire file 120 is considerably reduced from that of prior art backup systems which generally backup a entire file as one complete portion from beginning to end using only one stream or trail of data. In the case of very large files, significant amounts of time are saved when performing backup operations using the system of the invention.

General Restore Operation

In a similar manner, the invention provides a unique restore arrangement which operates to recover a file backed-up to backup devices 114 in the event of a failure of the data storage system 112. When the failure of the data storage system 112 is corrected (e.g., a failed hard disk drive storing one or more data portions 120-1 through 120-3 of the file 120 is replaced), the system of the invention allows a file 120 that has been backed-up by storing different data portions 120-1 through 120-3 on different backup devices 114-1 through 114-L to be restored to the storage devices 116-1 through 116-K in a parallel or concurrent manner. Since each data portion 120-1 through 120-3 was independently backed-up as a separate backup work item (to be explained) and is maintained on the backup devices 114 as a distinct backup image, during the restore operation, the backup devices 114-1 through 114-L can each concurrently provide (e.g., can read from magnetic tape) a separate stream or trail of data corresponding to a backup image of a respective one of the backed-up data portions 120-1 through 120-3. The backup server 113 provides these concurrent trails of data (e.g., two or more concurrent trails) in a parallel manner from the backup devices 114 on the backup server 113 to respective storage devices 116-1 through 116-K in the data storage system 112. Thus, an original file (e.g. file 120) that is damaged can be restored in this invention by concurrently restoring two or more portions of the file (e.g., data portions 120-1, 120-2, 120-3) during the same time period. As with the backup operation, restoring a single file as a number of concurrently restored portions greatly reduces the amount of time required to restore the entire file.

Backup and Restore System Architecture

Directing attention now to FIG. 1, the backup host client 111 can be any type of computer system such as a personal computer, workstation, mainframe or the like or may be a dedicated special purpose computer system. There may be many more than just the one backup host client 111 as shown in FIG. 1, and each may interface to one or more central or shared data storage system(s) 112. The backup host client(s) 111 may be on a network, for example, with interfaces 101 and/or 102 being network interfaces. Alternatively, interface 102 may be a dedicated high speed data connection, such as a fiber optic link, SCSI, Ultra-SCSI or Fast-Wide-SCSI interface, or other peripheral data interface coupling the data storage system 112 to the backup client host 111. By way of example, the backup host client 111 can be a workstation configured as a database server on a network, wherein the data for the database (e.g., a large Microsoft Exchange data file stored/maintained by a Microsoft Exchange server executing on the backup host client 111) is stored as file 120 within the data storage system 112.

The data storage system 112 may be any type of data storage device or facility, such as a multi-disk or RAID storage system that uses mass storage techniques to store the files (e.g. 120) across a plurality of storage devices 116. The storage devices 116 may be hard disk drives, optical drives, or other types of high speed data storage devices which provide random access to the files (e.g. 120) stored therein. To provide such access, the LVM process 110 on the backup host client 111 (in this example) communicates with the control circuitry 115 (in the data storage system 112) over interface 102, and the two are generally responsible for managing the layout of individual files, such as file 120, within the storage devices 116. A typical data storage system 112 provides an arrangement in which each storage device 116 is a hard disk drive having at least one disk partition. A number of disk partitions may be grouped together into a volume (not specifically shown in FIG. 1) which is managed by the LVM 110 on the backup host client 111. The control circuitry 115 in the data storage system 112 operates in conjunction with the LVM process 110 on the backup host client 111 to present volume(s) as contiguous portions of accessible (i.e., readable and/or writeable) data storage space to software applications (e.g., the backup client program 207, or a database application—not shown) executing on the backup host client 111.

An example of a data storage system 112 with which the invention may interoperate is the Symmetrix product line of mass data storage systems produced by EMC Corporation of Hopkinton, Mass. Symmetrix is a trademark of EMC Corporation. A typical Symmetrix data storage system can have a data capacity ranging from a few gigabytes up to multiple terabytes. This storage capacity is generally provided by many individual hard disk drives (e.g., 116-1 through 116-K in FIG. 1) managed as one or more volumes of storage by one or more LVMs 110 and control circuitry 115.

The backup server 113 may be a computer system that is optimized to interface with and operate the backup storage devices 114. The backup storage devices 114 are typically magnetic tape drives that can mount and access (i.e., read to and write from) magnetic tape(s). The example in FIG. 1 illustrates three tape drives 114-1, 114-2 and 114-L coupled via interface 104 to the backup server 113. However, there may be any number of backup storage devices 114 which interface to the backup server 113 via interface 104, and this invention is not limited to systems in which the backup devices are magnetic tape drives. For instance, the backup devices may be writeable optical media, such as CD-R drives, or any other type of high capacity storage or memory device that can be used to maintain backup data. The interface 104 between the backup server 113 and the backup devices 114 may be a dedicated high speed data coupling such as a fiber optic link, SCSI, Ultra-SCSI, Fast-Wide-SCSI, or other data interface.

An example of a typical backup server 113 is the EMC Data Manager (EDM) system manufactured by EMC Corporation of Hopkinton, Mass. A typical EDM system can have nine tape drives coupled to the backup server and each tape drive may be independently controlled with a separate individual stream or trail of data being concurrently written to or read from each tape drive.

Figure 2:
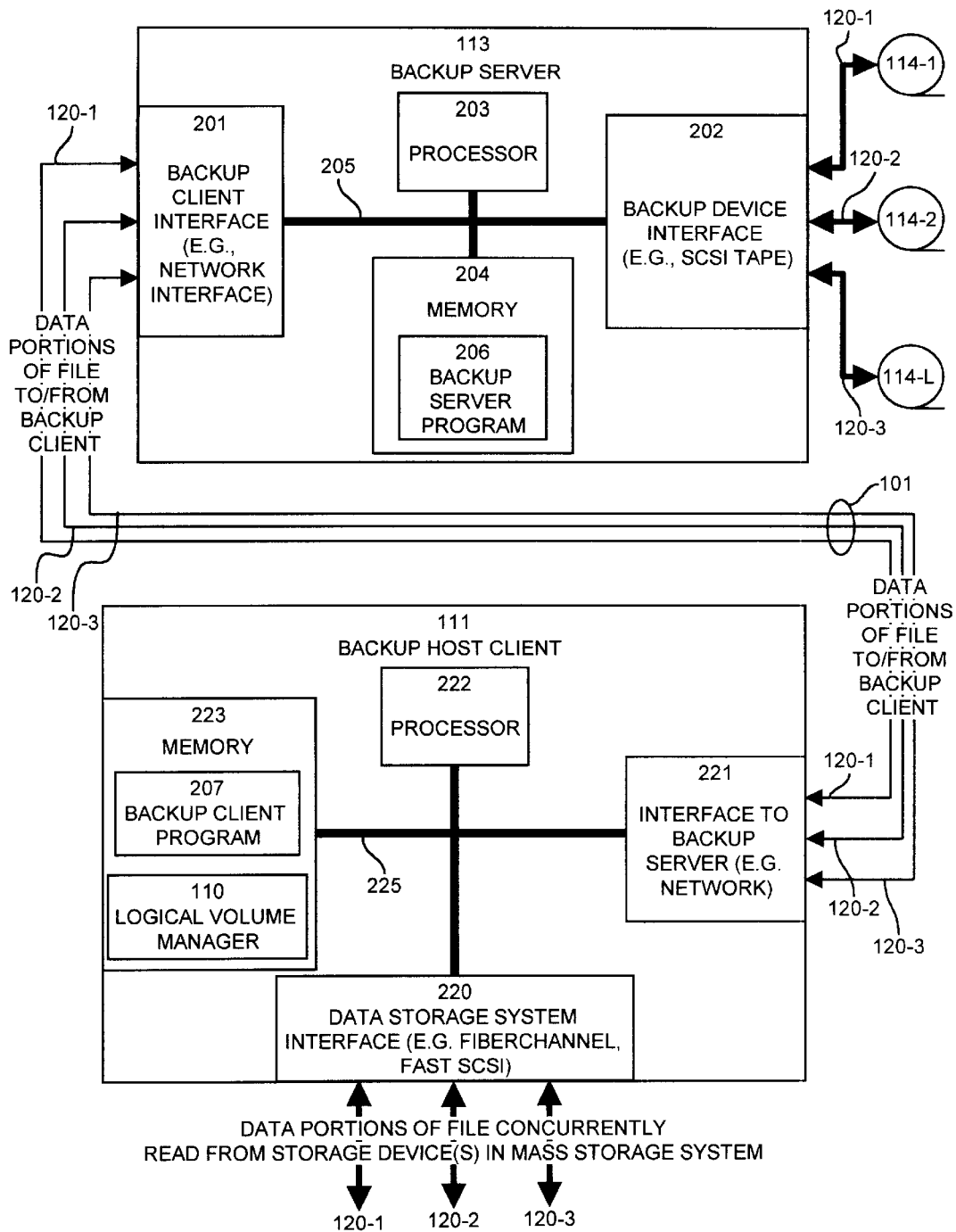
FIG. 2 illustrates the flow of data for backup and restore procedures and the interrelationship between a backup server and backup client host according to an example architecture and configuration of the invention.

FIG. 2 provides a more detailed illustration of the architecture and data flow relationship between the backup host client 111 and the backup server 113 during a backup and restore operation performed according to the invention. As shown in FIG. 2, the architecture of the backup host client 111 includes an interconnection mechanism 225 (e.g., a bus and/or circuitry) that couples a processor 222, a memory 223, an interface to the backup server 221, and a data storage system interface 220. A backup client program 207 and logical volume manager 110 reside as executable programs in the memory 223 within the backup host client 111. The backup client program 207 executes in conjunction with the processor 222 and is responsible for carrying out the operations of the invention that occur within the backup host client 111, as will be explained. The backup client program 207 can access (e.g., read and/or write) files such as file 120 stored within the storage devices 116 (FIG. 1) through requests sent to the LVM 110. The LVM 110 communicates with control circuitry 115 to provide filesystem and file layout information and to process read/write requests to data stored in the data storage system 112 via the bus 225 and the data storage system interface 220, which may be a SCSI or fiber optic interface, for example. The interface to the backup server 221 provides a coupling, such as a network interface, to allow the backup client program 207 to communicate with the backup server program 206 within the backup server 113.

The backup server 113 includes an interconnection mechanism 205 which couples a processor 203, a backup client interface 201 (e.g., network interface), a backup device interface 202 (e.g. SCSI interface), and a memory 204. A backup server program 206 resides in the memory 203 and executes in conjunction with the processor 203 in accordance with the techniques provided by the backup server 113 as described herein. The backup server program 206 can independently and simultaneously control (e.g., read to or write from) each backup device 114-1 through 114-L, which are each tape drives in this example, via the backup device interface 202.

During a backup or restore operation, each of which will be explained in more detail shortly, the backup client program 207 on the backup host client 111 enables the data storage system 112 to concurrently provide (in the case of a backup) or receive (in the case of a restore) data streams for multiple data portions (e.g., 120-1 through 120-3 in this example) of a file (e.g., 120), through the backup host client 111, to (backup) or from (restore) the backup server 113 over the network 101. Each data portion 120-1 through 120-3 is received by (backup) or sent from (restore) the backup server 113 to or from a respective backup device 114-1 through 114-L. The concurrent flow of data portions 120 for a backup operation is in the direction of backup host client 111 to backup server 113, which the data flow for a restore operation is the reverse, as indicated by the arrow heads on the data flow lines.

Figure 3:
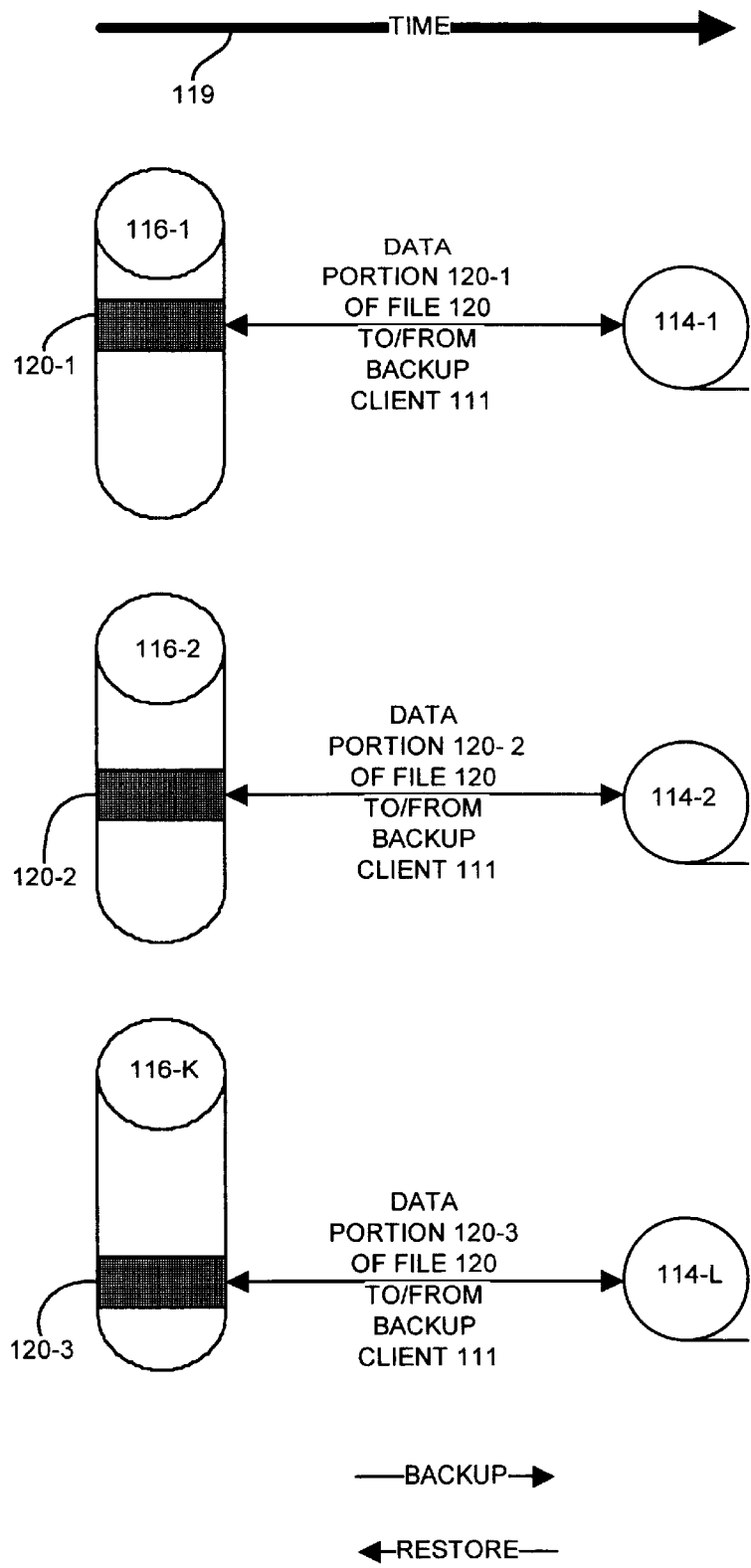
FIG. 3 illustrates different data portions being backed up and restored concurrently between respective disk storage devices and respective tape backup devices according to arrangements of the invention.

FIG. 3 explicitly illustrates the multi-trail backup and restore capabilities of the invention. This simple illustration indicates how the present invention can save significant amounts of time when backing up or restoring files 120 that are stored within a data storage system 112 as multiple data portions 120-1 through 120-3 and that are backed up using a backup server 113 that controls the backup devices 114. The system of the invention can transfer different data portions 120-1 through 120-3 associated with the same file 120 between respective storage devices (e.g., disks), 116-1, 116-2 and 116-K and respective backup devices (e.g., tapes) 114-1, 114-2 and 114-L over the same time period. At the top of FIG. 3, the time line 119 indicates progression of time from left to right. As indicated by the arrowheads pointing right to each tape device 114, during the backup operation, the system of the invention can concurrently transfer (backup) data portions 120-1 through 120-3 to respective tape backup devices 114-1, 114-2 and 114-L during a common time period. Likewise, as indicated by the arrows directed left towards each storage device 116, during a restore operation, the system of the invention can concurrently transfer (restore) backed-up images of the data portions 120-1 through 120-3 from each tape backup device 114-1, 114-2, 114-L to respective storage devices 116-1, 116-2, 116-K.

Details of Backup Operation

Figure 4:
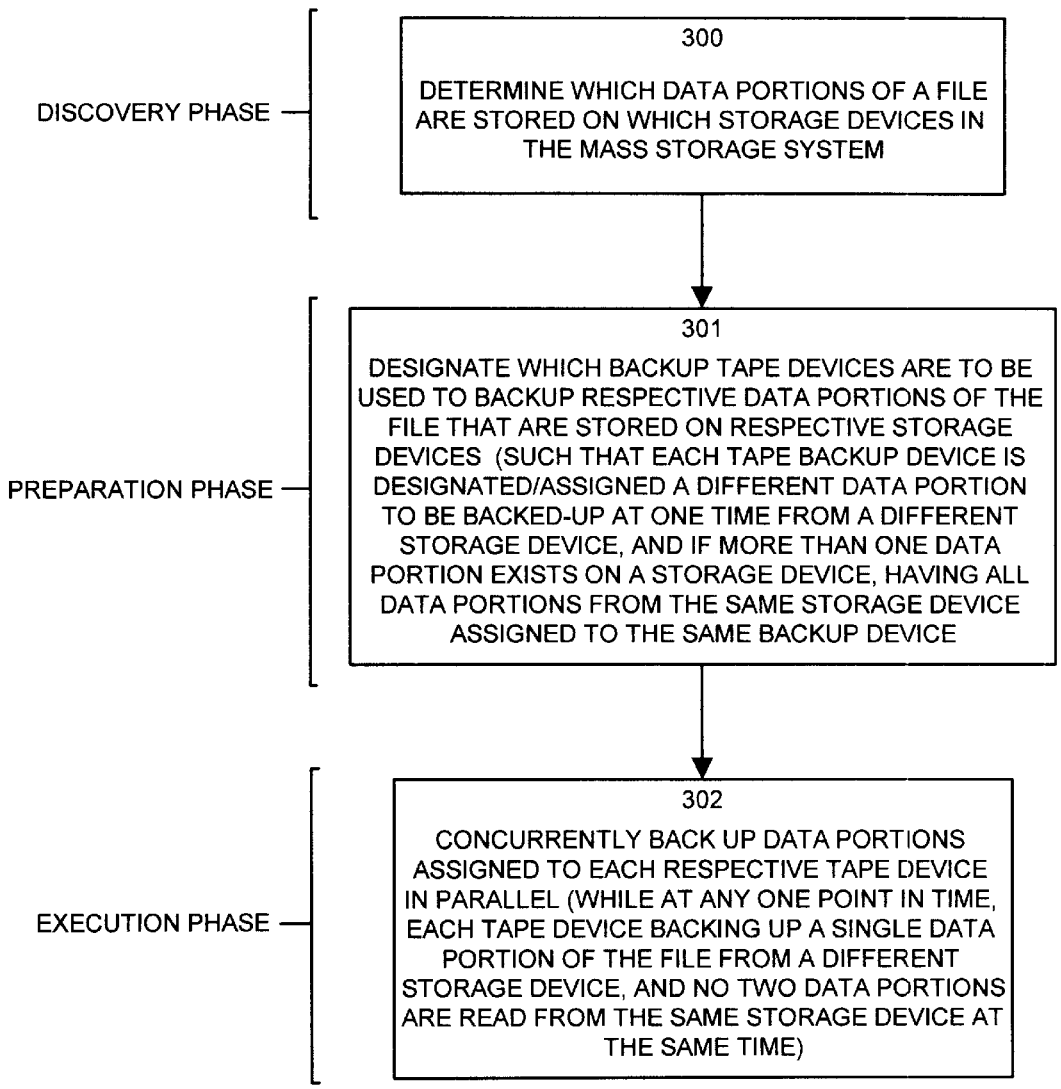
FIG. 4 is a high-level flow chart showing the discovery, preparation and execution phases that are provided according to one technique of the invention to backup a file from storage devices to backup devices using multiple data trails.

FIG. 4 shows a flow chart of the general processing procedures carried out according to arrangements of the invention to perform a backup operation using multiple data trails. As indicated in FIG. 4, there are generally three phases to the backup operation; the discovery phase (step 300), the preparation phase (step 301), and the execution phase (step 302). The backup techniques of the invention will be discussed in relation to the example architecture and configuration discussed above in FIGS. 1 and 2.

Generally, in the discovery phase of step 300, the system of the invention determines which data portions (i.e., 120-1 through 120-3) of a file are stored on which storage devices 116 in the data storage system 112. In a typical configuration, step 300 may be performed, for example, by the backup client program 207 querying the LVM 110 for information concerning the layout of the file 120 within the volume that contains the file (i.e., querying for information about which disks store data portions of the file).

Next, in the preparation phase in step 301, the system of the invention designates which backup devices 114, which are tape devices in the example, are to be used to backup respective data portions 120-1 through 120-3 (discovered in the discovery phase of step 300) of the file 120 that are stored on respective storage devices 116. Generally, the preparation phase is performed primarily by the backup server program 206 and determines how many backup devices 114 are available for this particular backup operation. One general goal of the preparation phase (step 301) is to assign or designate each data portion 120-1 through 120-3 that is stored on a unique storage device 116 to a different backup device 114. This allows each different data portion 120-1 through 120-3 to be backed-up concurrently, at one time, from each different storage device 116.

Note that if the preparation phase detects that more than one data portion (e.g., ore than one of 120-1 through 120-3) exists on the same storage device 116 (e.g., two data portions are on the same disk), then preferably, the preparation phase assigns these two data portions to the same backup device (this example is not shown in FIGS. 1, 2 or 3). This aspect of the invention is not meant to be limiting, and in alternative arrangements, two data portions sharing the same storage device (disk) may be assigned to different backup devices (tapes). However, by assigning data portions that share the same storage device to the same backup device, the invention can assure that two data portions will not be read from the same storage device (disk) at the same time, thus decreasing the efficiency of that disk and thus the overall backup operation. This is because a single backup device such as a tape drive can only write one stream of data at a time, and thus using the preferred arrangement and technique, two or more data portions sharing the same storage device will be backed-up sequentially with respect to each other, though they can as a group be backed up concurrently with other data portions stored on other storage devices assigned to other backup devices.

Once the preparation phase has determined which data portions 120-1 through 120-3 will be backed up by which backup devices 114, the system of the invention processes the execution phase in step 302. In step 302, the system concurrently backs up, in parallel, data portions 120-1 through 120-3 assigned to each respective backup tape device 114-1 through 114-L. At any one point in time during the execution phase (Step 302), each backup device 114 is busy backing up a single data portion (e.g., one of 120-1, through 120-3) of the file 120 from a different storage device 116-1 through 116-K, with respect to other backup devices 114. Due to the nature of data portion to backup device assignments that was performed in the preparation phase, no two data portion 120 are read from the same storage device at the same time. When the backup is complete, steps 300 through 302 may be repeated for another file.

Backup Discovery Phase

Figure 5:
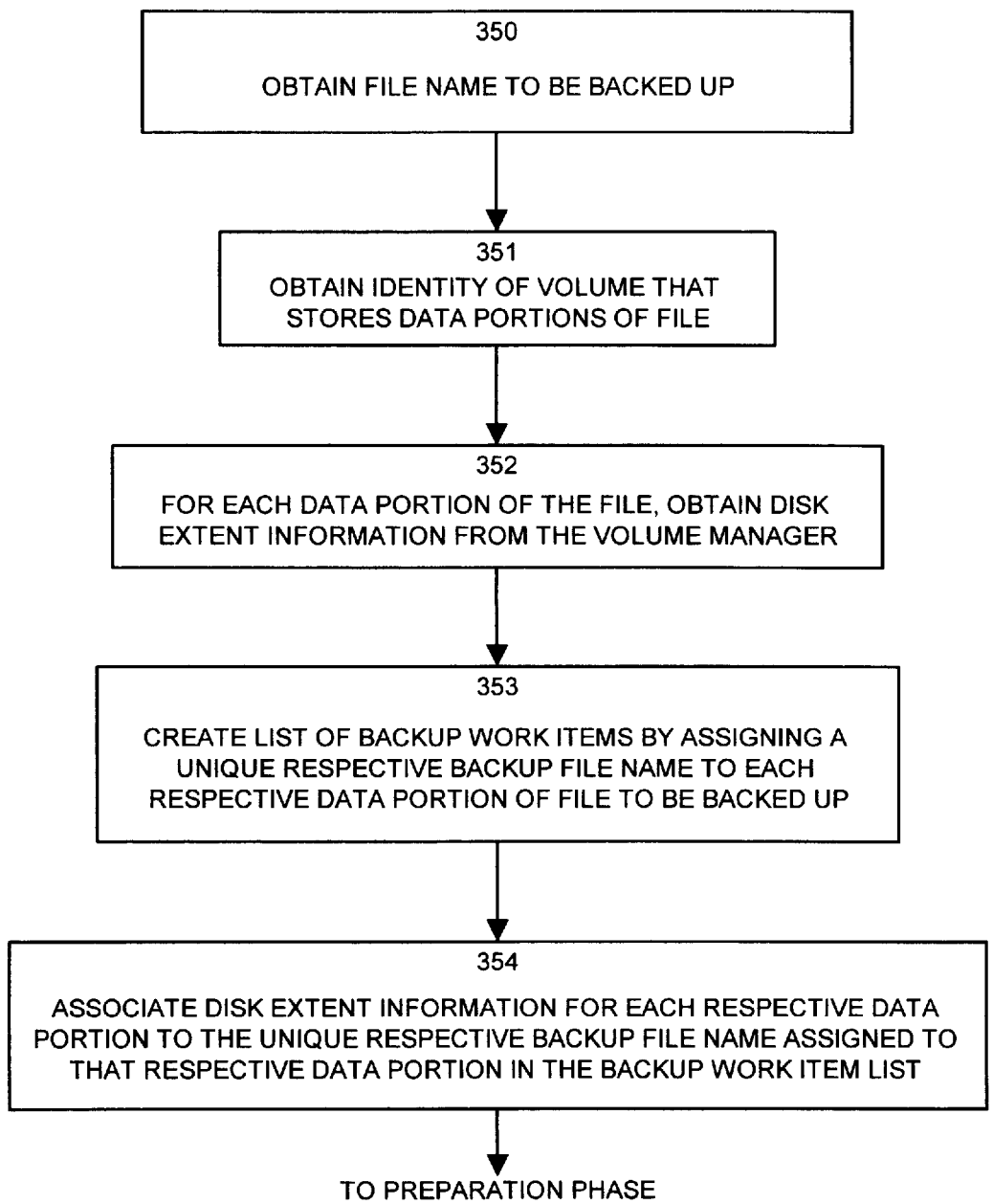
FIG. 5 is a flow chart showing in more detail the processing steps used in the backup discovery phase of the invention.

In FIG. 5, steps 350 through 354 show the details of processing that takes place during a typical discovery phase (Step 300 in FIG. 4) according to one arrangement of the invention. In step 350, the backup client program 207 obtains the file name of a file (e.g., filename of file 120) to be backed up. The filename may be provided, for example, by a user (not shown) of the backup host client 111. For example, suppose that the backup client program 207 determines in step 350 that the file name of the file 120 to be backed up is:

Public.dat.

Next, in step 351, the backup client program 207 queries the LVM 110 to obtain the identity of the volume that stores the file and to obtain the identity of the various data portions (i.e., 120-1 through 120-3) of the file stored on disks throughout the volume. Recall that a volume is typically an arrangement or grouping of various disk partitions across which a file may be stored. Thus, in one technique of step 351, the backup client program 207 queries the LVM 1O to determine the identity of the volume storing the file Public.dat, and once the volume identity is determined (e.g., Volume1) the backup client program determines which disk partitions (corresponding to data portions 120-1 through 120-3 in the example) in that volume store the file 120. In this example arrangement of the invention, the data portions 120-1 through 120-3 correspond directly to disk partitions of a volume within the data storage system 112. The output of step 351 may appear as follows:

Public.dat: Volume1:disk116-1:disk116-2:disk116-K

Each field in the above example output data (and in future examples) is separated by a colon. As indicated in this example, the filename (Public.dat), volume (Volume1) and disk partitions (disk116-1, disk116-2 and disk116-K) are all provided in the output of step 352.

Next, in step 352, the backup client program 207 queries Volume1 (determined in step 119) using the LVM 110 (FIG. 1) to obtain disk extent information for each data portion 120-1 through 120-3 (e.g., disk extent information for each disk partition storing a data portion of the file 120, as detected in step 351). Among other things, disk extent information identifies, for each respective data portion 120-1 through 120-3, a respective storage device (e.g., one of 116-1 through 116-K) that stores that data portion, as well as a size (e.g., how many megabytes) and placement (e.g., address range on disk) of the data portion within the identified storage device 116. In the example in which data portions 120-1 through 120-3 correspond to disk partitions, the disk extent information conveys the partition layout of disk partitions that store the file 120 within each disk116. The output produced as a result of steps 351 and 352 may, for example, appear in the following syntax:

Public.dat: Volume1:disk116-1:disk116-2:disk116-K:0, 100,1000:0,200,2000:0,300,4000

The information above indicates that the file Public.dat is stored in Volume1across three different physical disks associated with that volume; disk 116-1, disk 116-2, and disk116-3. The partition (data portion 120-1) on disk116-1 that stores the first part of Public.dat is located between disks units (e.g., addresses that may indicated sectors, blocks, tracks, bytes, kilobytes, megabytes or other measurements within a storage device) 100 and 1000, beginning relative to address 0 on this disk, as indicated by the 0,100,1000 partition extent data for disk partition 116-1. The partition on disk116-2 that stores a second part (second data portion) of Public.dat is located between disks units 200 and 2000, beginning relative to address 0 on that disk. Finally, the partition on disk116-K that stores the third part of Public.dat is located between disks units 300 and 4000, beginning relative to address 0. Essentially, the backup client program 207 uses the output from steps 351 and 352 to determine which data portions (partitions 120-1 through 120-3) on which disks (116-1 through 116-K) store the data portions that comprise the file 120.

Next, in step 353, the backup client program 207 creates a list of backup work items by assigning a unique respective backup file name to each respective data portion 120-1 through 120-3 (i.e., each partition containing some of the file) of the file 120. A backup work item is a entry in a list that corresponds to a backup image that will be copied (i.e., backed up) from disk to tape using a single stream or trail of data. Thus, in step 353, the backup client program 207 generates a file name for each individual data portion 120-1 through 120-3 of the file. Next, in step 354, the backup client program 207 associates the disk extent information (determined in step 353) for each respective data portion 120-1 through 120-3 (i.e., extent information for each disk partition) to the unique respective backup file name generated and assigned to that data portion in the backup work item list. In the example, steps 353 and 354 generate three backup work items (one for each data portion 120-1 through 120-3) for the file 120. The data in the backup work item list produced from processing steps 353 and 354 may appear, for example, as follows:

Backup work item list:
    Work-Item-1:Public.dat_1:Volume1:disk116-1:0,100, 1000
    Work-Item-2:Public.dat_1:Volume1:disk116-2:0,200, 2000
    Work-Item-3:Public.dat_1:Volume1:disk116-K:0,300, 4000

As indicated in the backup work item list above, each backup work item (each row) includes a file name (Public.dat_1, Public.dat_2 or Public.dat_3) corresponding to one of the data portions 120-1 through 120-3 of the file 120, as well as corresponding volume (Volume1), disk partition (disk 116-1, disk 116-2, or disk 116-K) and disk extent information (0,100,100, 0,200,2000, and 0,300,4000) for that backup work items respective data portion.

Backup Preparation Phase

Figure 6:
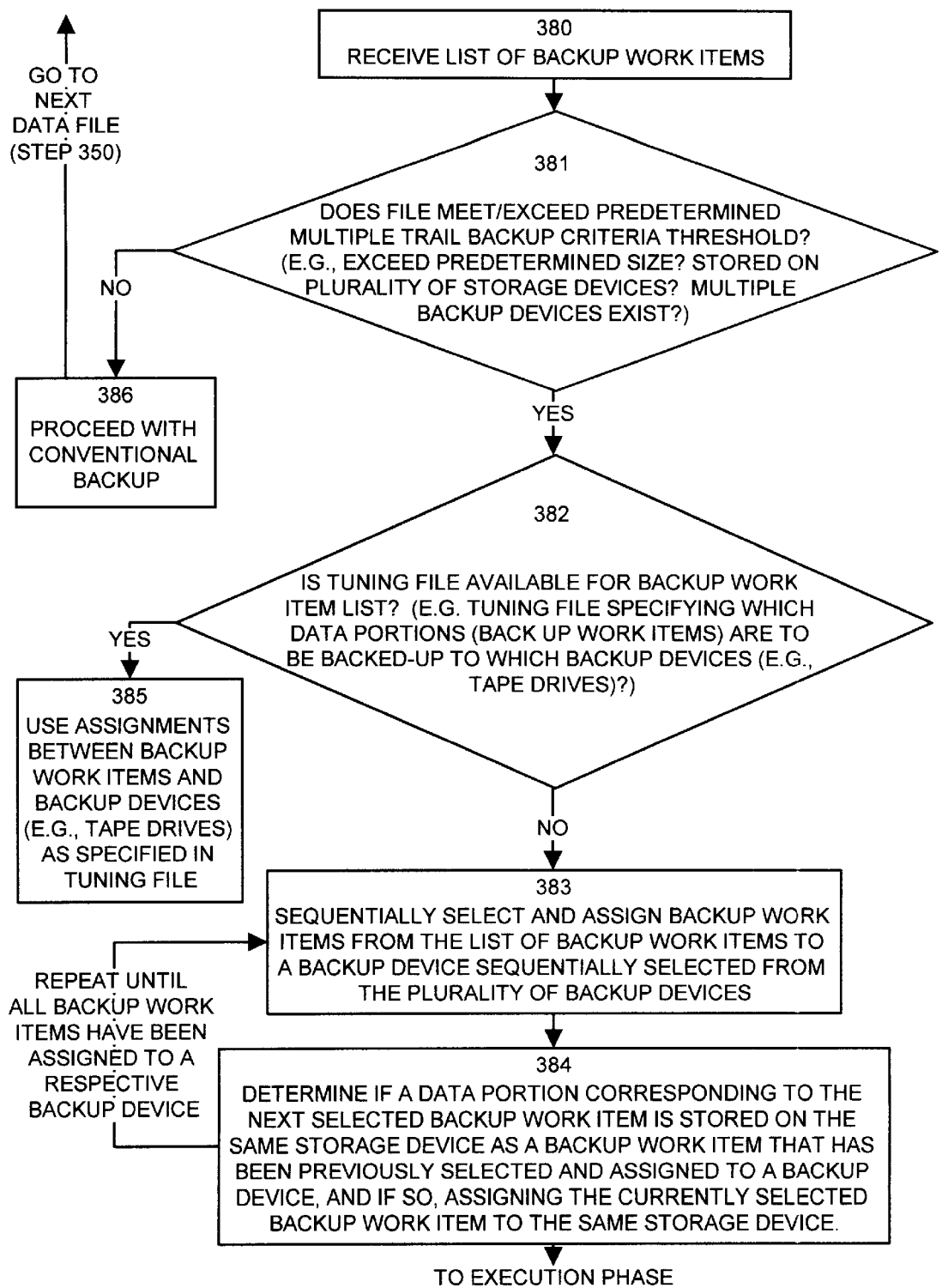
FIG. 6 is a flow chart showing in more detail the processing steps used in the backup preparation phase of the invention.

Once the discovery operation is complete, the backup client program 207 proceeds with the preparation phase as shown in steps 380 through 386 in FIG. 6. The objective of the preparation phase is to assign each backup work item in the backup work item list to a specific backup device. In other words, at this point, each disk partition 120-1 through 120-3 storing a portion of the file 120 (as listed as backup work items in the backup work item list) is treated in the preparation phase as an individual distinct file in and of itself for backup purposes and is assigned to a specific tape drive for backup.

More specifically, in step 380 in FIG. 6, a preparation routine in the backup client program 207 receives the list of backup work items prepared in the discovery phase (Step 300 in FIG. 4) as explained above. Next, in step 381, the backup client program 207 detects if the file 120 meets predetermined threshold criteria for a multiple trail backup, based on the information obtained in the discovery phase (Steps 350 through 354 in FIG. 5). Such criteria are generally a set of limitations used by the backup client program 207 to provide a determination if Public.dat should or should not be backed up using the multiple trail backup techniques of the invention.

By way of example, one criteria may be that the file 120 (Public.dat) must be stored as a plurality of data portions 120-1 through 120-3 on different storage devices 116-1 through 116-K (as indicated from information obtained in the discovery phase). Another criteria may be that the backup server 113 be capable of operating and providing a plurality of backup devices 114 (e.g., at least two of backup devices 114-1 through 114-K) to handle the backup of the file 120. Another criteria, which may be configured on a case by case basis, may be a requirement that the file 120 exceed a predetermined minimum file size, such as twenty gigabytes. This last criteria is useful to apply the techniques of the invention only to large files which when backed up, derive great benefit from the time saving aspects of the invention. If step 381 determines that the multiple trail backup criteria are not met, then the backup client program 207 processes the file Public.dat according to conventional backup techniques in step 386, and then proceeds to the next data file (i.e., proceeds to step 350 in FIG. 5 for the next file, if other files are specified to be backed up).

However, if in step 381, the backup client program 207 determines that the criteria are met for performing a multiple trail file backup, then in step 382, the backup client program 207 determines if a tuning file has been prepared for the work items listed in the backup work item list. A tuning file, which will be explained in more detail, is generally a file, data structure or information that specifies which backup work items from the backup work item list are to be assigned (e.g., are to be copied during the actual backup) to which backup devices (e.g., 114-1 through 114-L) in the backup server 113. For example, a tuning file for the file 120 may appear as follows:

Tuning File Example:
    Tuning File entry 1:Work-item-1:tape114-1
    Tuning File entry 1:Work-item-2:tape114-2
    Tuning File entry 1:Work-item-3:tape114-L The above tuning file information is provided as an example only of the type of information that can exist in a tuning file, and is not meant to be limiting of the invention. If a tuning file is available, then the backup client program 207 proceeds to step 385 and used assignments between the backup work items and backup devices (e.g., tape drives 114-1 through 114-L) as specified in information contained in the tuning file. If a tuning file is not available, then the backup server program processes steps 383 and 384.

In step 383, the backup client program 207 sequentially selects and assigns backup work items from the list of backup work items to backup devices (e.g., tape drives 114-1 through 114-L) sequentially selected from the plurality of backup devices available for use on the backup server 113. After each assignment is made between a backup work item and a backup device, in step 384, the backup server program 207 determines if a data portion corresponding to the next backup work item (i.e., the next one to be assigned to a backup device) is stored on the same storage device (e.g., one of disks 116) as a backup work item that has been previously selected and assigned (via step 383) to a backup device. If so, the backup server program 207 assigns this backup work item (i.e., the one currently undergoing an assignment to a backup device) to the same backup device as the previously assigned backup work item occupying the same storage device.

The backup client program 207 may communicate with the backup server program 206 in steps 383 and 384 to determine which backup devices are available for use in a backup operation. In this manner, the assignment of which data portions will be stored on which backup devices ensures that two data portions occupying the same storage device will occupy the same backup tape as well. This avoids the possibility of reading two data portions from the same disk concurrently during the process of backing up the data portions, which may decrease backup efficiency.

When steps 383 and 384 have completed, the example backup work item list may appear as follows:

Backup work item list:
    Work-Item-1:Public.dat_1:Volume1:disk116-1:0,100, 1000:tape114-1
    Work-Item-2:Public.dat_1:Volume1:disk116-2:0,200, 2000:tape114-2
    Work-Item-3:Public.dat_1:Volume1:disk116-K:0,300, 4000:tape114-L As indicated above, each backup work item (each row) now contains an indication (at the end of each row) of which backup device 114 is to be used to store which data portion 120-1 through 120-3 of the file 120.

Backup Execution Phase

Figure 7:
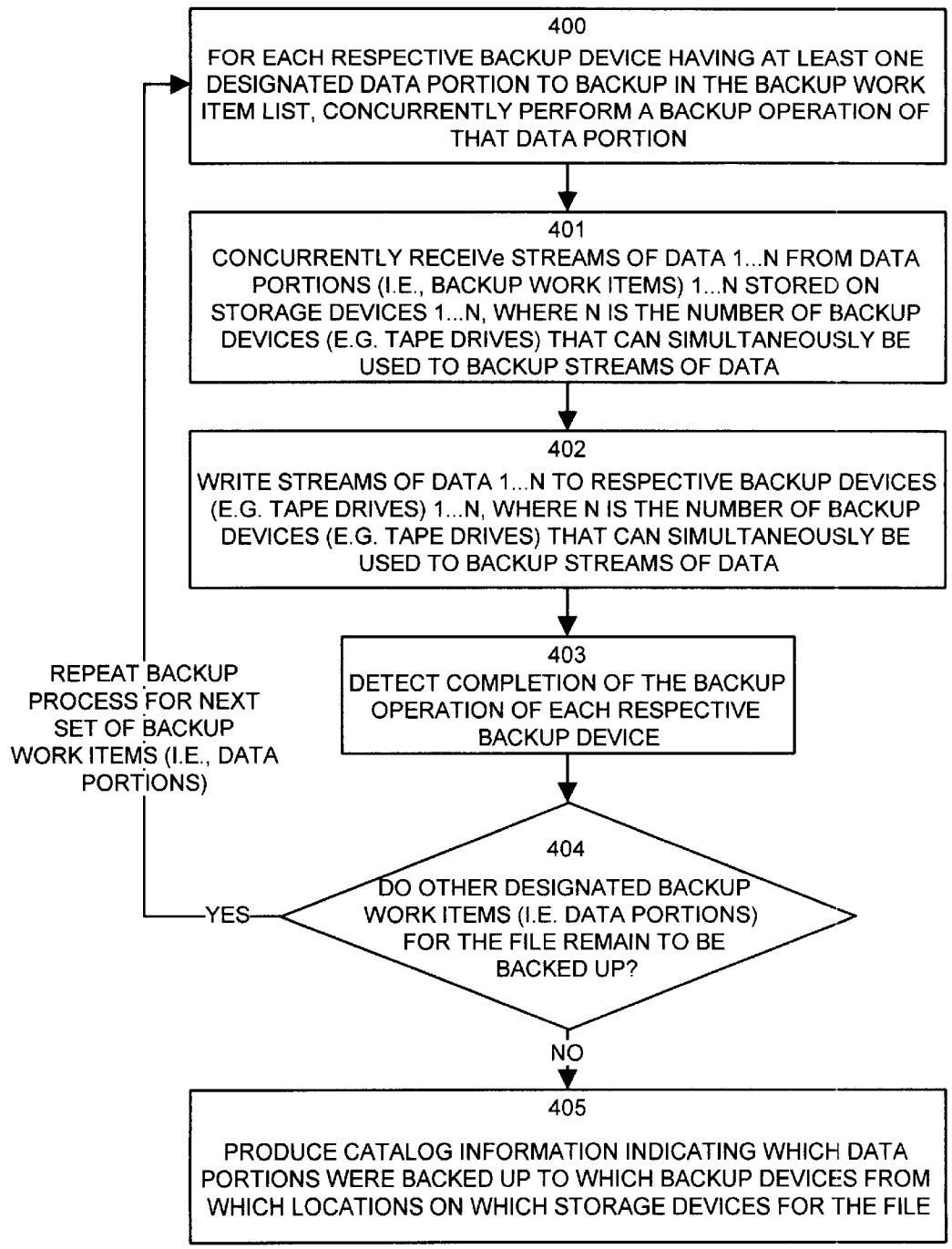
FIG. 7 is a flow chart showing in more detail the processing steps used in the backup execution phase of the invention.

After the preparation phase is complete (Steps 380 through 385) as explained above), the backup client program 207 enters the execution phase as shown in steps 400 through 405 in FIG. 7. In step 400, the backup client program 207 in conjunction with the backup server program 206 concurrently perform a backup operation for each respective backup device 114 having at least one designated data portion 120-1 through 120-3 to backup as specified in the backup work item list. Note that if there are multiple backup work items assigned to a single backup device, only the first set of backup work items is selected for backup, such that all assigned backup devices are busy performing a backup operation of a single respectively assigned data portion (e.g., 120-1 through 120-3).

In step 401 of the backup operation, the backup client program 207 concurrently receives streams or trials of data 1 through N from data portions (specified by backup work items) stored on storage devices 116. In the example configuration (FIG. 2), the data storage system 112 concurrently supplies streams of data for each of the data portions 120-1 through 120-3 from each of the disk drives 116-1 through 116-K. These data streams are forwarded from the backup client program 207, over the network 101 (FIG. 1), to the backup server program 206. In step 402, the backup server program 206 writes each stream or trail of data I through N to a respectively assigned backup device 114 (as specified in the backup work item list). In steps 401 and 402, N is the number of different backup devices 114 that are operable by the backup server 113 and that are assigned (in the backup work item list) to simultaneously receive and write streams of data portions to be backed up (e.g., data portion streams 120-1 through 120-3 in FIG. 2).

In step 403, the backup server program 206 detects completion of the backup operation of each respective backup device 114 and communicates this event to the backup client program 207. Next, in step 404, the backup client program 207 determines if other backup work items remain to be backed up, as specified in the backup work item list. If so, processing proceeds back to step 400 where the next set of backup work items is processed via steps 400 through 403. If no more work items remain, the backup client program 207 proceeds to step 405, at which point the backup client program 207 produces catalog information indicating which data portions 120 were backed up to which backup devices 114 from which locations (i.e., partition extents) on which storage devices 116. After step 405, the multiple trail backup processing for the selected file 120 is complete. Processing may then proceed with other files in a master list of files that are to be backed up, if such exists.

In this manner, the processing provided by the discovery and execution phases essentially breaks down a single file 120 into respective files corresponding to each data portion, and then steps 400 through 402 of the execution phase allow the individual file portions to be concurrently backed up in parallel as separate files. The limitation on how many data portions may be concurrently backed up is generally governed by how many backup devices 114 are available to accept streams of data. In the example, since there are three data portions 120-1 through 120-3 and three tape drives 114-1 through 114-L, each data portion 120 can be backed up in parallel with the others to a respectively different tape drive 114.

Details of Restore Operation

As indicated above in FIGS. 1 and 2, the present invention also provides the ability to restore a file (e.g., 120) as a number of data portions (e.g., 120-1 through 120-3) that are concurrently restored from respective backup devices (e.g., 114-1 through 114-L) to respective storage devices (e.g., 116-1 through 116-K).

Figure 8:
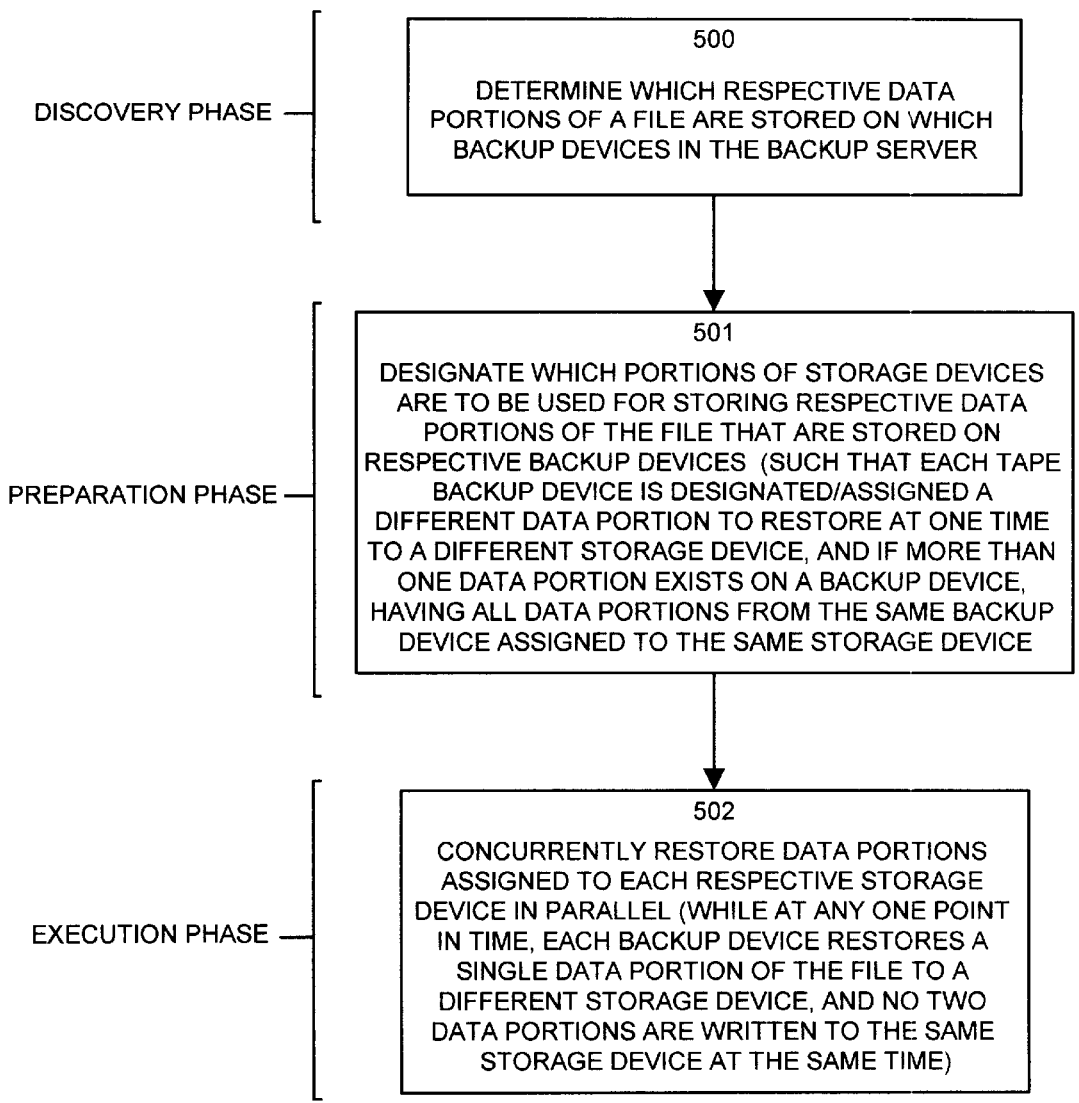
FIG. 8 is a high-level flow chart showing the discovery, preparation and execution phases that are executed according to one technique of the invention to restore a file from backup devices to storage devices using multiple data trails.

FIG. 8 illustrates the steps 500 through 502 that the system of the invention generally performs to carry out restoration of a file using multiple data trails. Similar phases of discovery, preparation and execution are performed as in the backup operation, except that in the case of the restore operation, the data portions are transferred in the reverse direction from backup devices 114 to storage devices 116.

In the discover phase shown in step 500, the backup client program 207 determines which respective data portions (e.g., backed up image versions of data portions 120-1 through 120-3 stored on tape) of a file are stored on which backup devices 114-K through 114-L in the backup server 113. The backup client program 207 may do this by communicating with the backup server program 206, or, for example, by examining a log file of the backup operation created when the data portions were written onto the backup devices 114 at backup time.

Next, in the preparation phase shown in step 501, the backup client program 207 designates which portions of the storage devices 116 (e.g., which partitions) are to be used for storing respective data portions of the file that are stored on the respective backup devices (as determined in step 500). Generally, the goal of the preparation phase is to assign the data portion(s) stored on each different tape backup devices 114 to different storage devices 116 such that during the restore execution operation, different data portions of the same file are restored to different storage devices at the same time. If more than one data portion exists on a backup device 114, then all data portions from the same backup device 114 (e.g., all images of data portions on one tape) may be, for example, assigned to be restored to the same storage device 116.

Finally, in the execution phase in step 502, the backup client and server programs 206 and 207 intercommunicate to concurrently restore data portions (e.g., backed up images of data portions 120-1 through 120-3 stored on backup devices 114-1 through 114-L) assigned to each respective storage device 116 in parallel. At any one point in time during the execution phase of the restore operation, each backup device 114 is busy restoring a single data portion (e.g., one of 120-1 through 120-3) of the file 120 to a different storage device 116 than other backup devices (e.g., others of 114), and no two data portions (two of 120-1 through 120-3) from any backup devices 114 are written to the same storage device 116 at the same time. In this manner, the maximum speed is obtained in the restore process since each disk drive storage device 116 only receives one stream of data for one data portion at a time and thus can operate most efficiently. Likewise, each tape backup device is kept busy, with each concurrently providing a trail of data from a data portion (backup image of one of 120-1 through 120-3) on tape to one of the storage devices 116.

Figure 9:
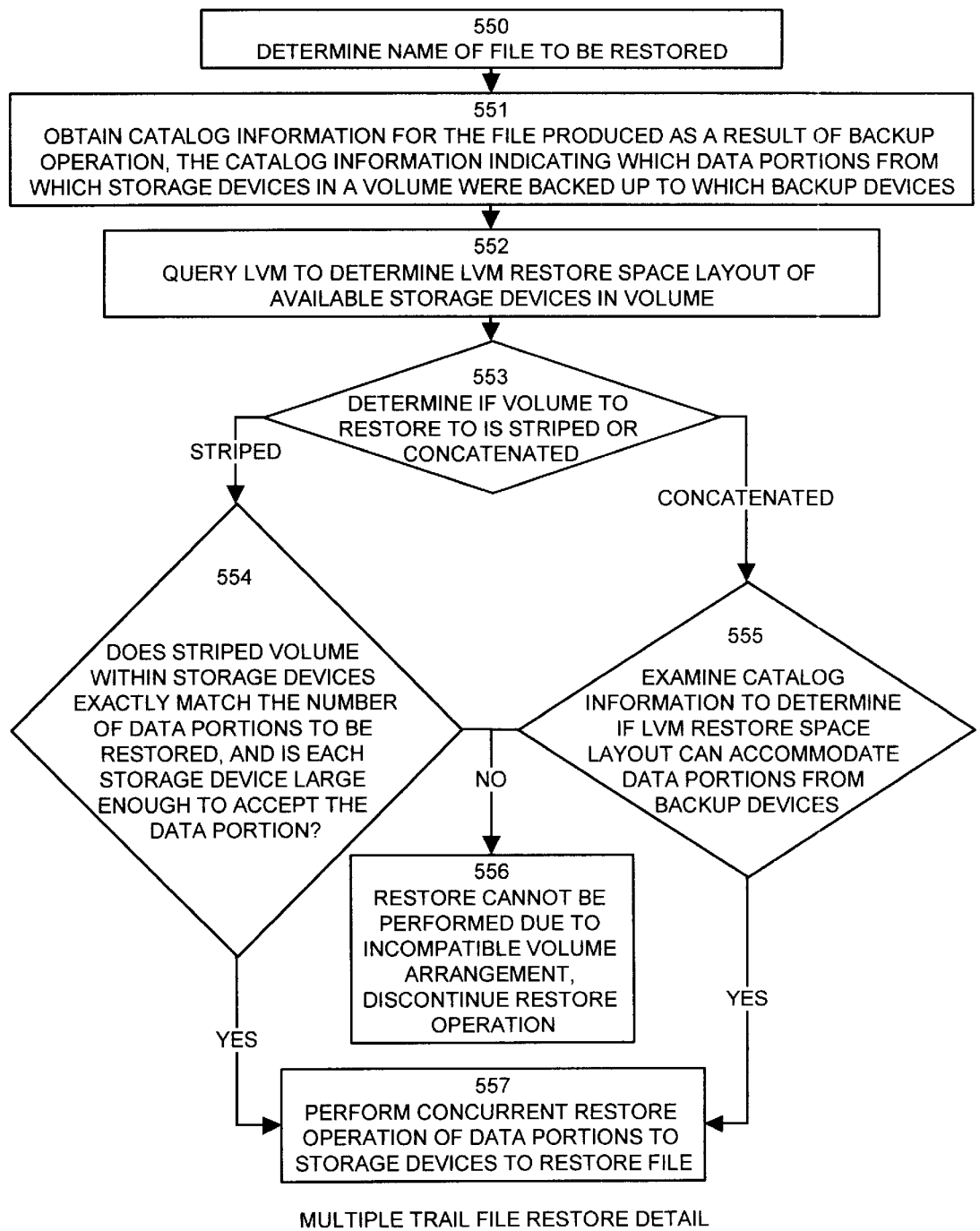
FIG. 9 is a more detailed flow chart illustrating the process of restoring a file according to one technique of the invention.

In FIG. 9, steps 550 through 557 illustrate in more detail the processing performed during a restore operation according to the invention. In step 550, the backup client program 207 receives the name of the file to be restored from the backup server. In step 551, the backup client program 207 intercommunicates with the backup server program 206 to obtain catalog information for the file being restored. Catalog information is produced as a result of the backup operation (step 405 in FIG. 7) and indicates which data portions (e.g., backed up images of 120-1 through 120-3) from which storage devices 116 of the file 120 were backed up to which backup devices 114. In other words, the catalog information indicates which tapes 114-1 through 114-L contain which data portions 120-1 through 120-3 of the file 120.

Next, in step 552, the backup client program 207 queries the LVM 110 (FIG. 1) to determine the LVM restore space layout of available storage devices 116 having partitions in a volume to which the file will be restored. That is, in step 552, the backup client program 207 determines the layout of the partitions on the disk storage devices 116 that are grouped together within the volume to which the file (i.e., the backup images of the data portions 120-1 through 120-3 that make up the file 120) is to be restored. This essentially provides an indication of what storage space can be written to in the volume when the data portions of the file 120 are restored from the tapes. Though the catalog information obtained in step 551 indicates the partition layout from which the file 120 was originally backed up, this may have been changed. In other words, the data portions making up the file 120 may be restored to a volume that includes a set of storage devices 116 that have somewhat different partition layouts (explained shortly) than the original storage devices from which the file 120 was backed up to tape.

Once the catalog information and restore space layout information are obtained, the backup client program 207 can begin restoration of the data portions of the file. However, the restore operation depends upon the type of volume that the data portions are being restored to.

Recall that there can be striped volumes and concatenated volumes. A file 120 that was originally backed up from a striped volume should generally likewise be restored to a striped volume. Similarly, a file backed up from a concatenated volume should generally be restored to a concatenated volume.

In step 553, if the file to be restored originally came from a striped volume, then step 554 is processed. In step 554, the backup client program 207 checks, via the LVM 110, to be sure that the striped volume within the storage devices (i.e., the volume about to receive the restored version of the file) has a storage device partition layout that exactly matches the number of data portions to be restored. Furthermore, the client program 207 checks, via volume layout information provided from query(s) to the LVM 110, to be sure that each storage device partition to which data will be restored is large enough in capacity to accept the data portion from a backup device. The two checks in step 554 are required since a striped volume spreads the data for a single file evenly across a certain number of partitions. As such, the same number of partitions should be available to restore the file. For striped volumes, each partition accepting the restored data may be larger in size than the data portion, but may not be smaller.

If the two checks in step 554 pass, then the backup client program 207 proceeds to process step 557. In conjunction with the backup server program 206, the two programs 206 and 207 work with each other to concurrently restore data portions to storage devices to restore the entire file. Note that in the case of striped volumes, assignments of a data portion from backup devices 114 to storage device partitions are one to one, since the striped volume must essentially mimic the layout of the original volume in number of partitions, but not in exact storage location or size of partitions (but the partition layout between the original volume and the volume to obtain the restored data must be equal in number and must be at least big enough to store the data portion).

If the checks in step 554 do not pass, the restore cannot proceed due to incompatible volume arrangements between the backup layout and the volume to be restored to. The backup client program 207 thus directs processing to step 556 to discontinue the restore operation until an administrator of the data storage system 112 can create a volume capable of accepting the file from the backup devices.

In step 553, if the volume from which the file 120 was originally backed up was a concatenated volume (as indicated in the catalog information for the backed up file), then the backup client program 207 processes step 555. In step 555, the backup client program 207 examines the catalog information to determine if the LVM restore space layout (i.e., the partition layout of the volume in the data storage system 112 that is about to accept the restored file) can accommodate the data portions (i.e., the backup images of the data portions 120-1 through 120-3) from the backup devices 114.

This determination may be made by the backup client program 207, for example, by determining that the total size of each of the partitions in the concatenated volume (to which data will be restored) are each large enough to accommodate the backup data portion images 120-1 through 120-3 stored on backup devices 114-1 through 114-L. In other words, if there are three backup file images on tape (i.e., on backup devices 114-1 through 114-L) as specified in the catalog information, and the LVM restore space layout also has three partitions of sufficient size, then the restore can go forward. Alternatively, if there are only two partitions in the concatenated volume that is to receive the restored data, then the total sum of the capacity of all partitions must be equal to or greater than the total size of all data portions 120-1 through 120-3 to be restored. In either case, processing proceeds to step 557 at which point at least two data portions are concurrently restored from the backup devices 114 onto respective storage devices 116 that maintain the volume.

Note that in the case of concatenated volumes, if three data portions 120-1 through 120-3 of the same file 120 are to be restored to only two storage devices, for example, the concurrent restore may be performed in a number of different ways in step 557, depending upon the number of backup devices upon which the data portions 120-1 though 120-3 are stored.

For example, if only two tape backup devices 114-1 and 114-2 are used (meaning that one tape contains two of the data portions 120-1 through 120-3), then the two tape drives can run in unison to concurrently restore the first and second data portions (e.g., 120-1 and 120-2) to two different storage devices (e.g., 116-1 and 116-2). The third remaining data portion may be restored after the data portion ahead of it on tape has completed. In the second way, if there are three tape drives 114-1 through 114-K that each respectively store one of the data portions 120-1 through 120-3 to be restored, then the system of the invention may either concurrently restore two data portions (e.g., 120-1 and 120-2) from two of the tape backup devices (e.g., from 114-1 and 114-2) concurrently, so as to only access each of the two storage devices 116 with one stream of data at one time. Then, when the storage device (e.g., 116-1) that is to receive the third data portion 120-3 has finished receiving either the first or second data portion for which it was assigned, that storage device 116-1 can being reception of the third data portion.

In any event, since the invention provides a mechanism to break-up a large file into individual data portions that may be treated for backup purposes as separate files, then the restore operation allows two or more of these data portions to be restored concurrently, thus saving significant time when performing restore operations.

Equivalents and Alternative Arrangements

It is to be understood that the aforementioned techniques are meant to be general in nature. That is, while specific arrangements and techniques have been presented in detail, variations in those techniques that still result in the ability to backup or restore a file using individualized portions that are concurrently transferred between the data storage system 100-1 and the backup server 113 are meant to be encompassed within the scope of this invention.

For example, in an alternative arrangement of the invention, the backup server 113 may perform the backup of a file (e.g. 120 in FIG. 1) according to the techniques of the invention by interfacing directly with the data storage system 112. This is illustrated in FIG. 1 by interface 103. Interface 103 provides a direct connection between the backup server 113 and the data storage system 112. The interface 103 thus alleviates the necessity to transfer file data during a backup or restore operation (as discussed above) through the backup host client 111. This conserves the bandwidth across interface 101 and may even eliminate the requirement for this interface (101).

According to this alternative arrangement, the backup server program 206 may contain much, if not all, of the processing provided by the backup client program 207 as discussed above. That is, while the discussion of the discover, preparation and execution phases is provided above with respect to the backup client program 207 performing many of the processing steps, the system can just as well perform such steps by the backup server program 206, and many of the operations are shared between the two programs.

As an example, the backup server program 207 may interface with the backup host client 111 only to query the LVM 110 during the discover phase for information about the volume, partition and file layout. Once the execution phase begins data transfer however (to restore or backup the actual file data), the data transfer can be offloaded to interface 103 (FIG. 1). Alternatively, the backup server program 206 can intercommunicate directly with an LVM (not shown in the example figures) and/or with the control circuitry 115 that can be provided internally within the data storage system 112 to determine the layout of the data portions 120-1 through 120-3 of the file 120 within the disks 116. In this case, there may be no communication needed with the backup host client 111 (as the LVM 110 is bypassed completely) to backup or restore files. In this instance, backup and restore operations would normally be performed directly between the backup server 113 and the data storage system 112 at a time when it could be assured that the backup host client 111 is not attempting to access (e.g., read and/or write) to or from the file 120.

A software product such as Timefinder, manufactured by EMC Corporation, provides a mechanism for the data storage system 112 to provide a full copy of data that is to be backed up, so that backup operations of the copy of the data can be performed with minimal interruption to the backup host clients requirements to access the data. In this manner, interface 103 can be used to reduce or eliminate the need for the backup host client 111 to provide and/or execute the backup client program 207.

It is also important to note certain aspects of the invention with respect to the tuning file. During a restore operation, as noted above, a tuning file can be used to specify exactly which data portions are to be placed upon which backup devices. The tuning file may be created, for example, by a systems administrator (a human user—not shown in the figures). To do so, the administrator would need to know how the file to be backed up is apportioned across the volume in which it resides. Essentially, this operation is performed by the discover phase of the backup operation, as discussed in FIG. 4 (Steps 300 and 301), FIGS. 5 and 6. Since the discover phase determines the layout of a file across the partitions of a volume and produces a backup work item list indicating such layouts, an alternative arrangement of the invention allows the discover phase to be executed by an administrator independently of the rest of the backup operation. That is, an administrator is able, in this arrangement, to execute only steps 350 through 354 (FIG. 5).

Steps 350 through 354 generally produce an output in the form of the backup work item list such as the following (reproduced from the above described example):

Backup work item list:
Work-Item-1:Public.dat__1:Volume1:disk116-1:0,100, 1000
Work-Item-2:Public.dat__2:Volume1:disk116-2:0,200, 2000
Work-Item-3:Public.dat__1:Volume1:disk116-K:0,300, 4000

Using this information, as well as knowledge of the capacity of each tape backup device 114 through 114-3, the administrator can create a simple tuning file indicating which work items are to be placed on which backup devices. The resultant tuning file for this example might look something like this:

Tuning File:
Tuning File entry 1:Work-item-1:tape114-1
Tuning File entry 1:Work-item-2:tape114-2
Tuning File entry 1:Work-item-3:tape114-L Alternatively, if only two tape backup devices (e.g., 114-1 and 114-2) were available for a backup operation, and one were much faster than the other (e.g., 114-2 was faster than 114-1), then the tuning file could take this knowledge into account and might assign two of the larger data portions (e.g., 120-2 and 120-3) to the faster tape backup device 114-2. Such a tuning file might appear as follows:

Tuning File:
Tuning File entry 1:Work-item-1:tape114-1
Tuning File entry 1:Work-item-2:tape114-2
Tuning File entry 1:Work-item-3:tape114-2

Once such tuning files are created, the backup operation can be performed in total and the proper tuning file to use for the backup can be specified upon invocation of the backup procedure.

It is also important to understand that many aspects of the invention are not meant to be limiting. For instance, any type of file or related segment of data can be backed up and restored by the invention. Any type of data such as a database file, a raw partition, an application, or any other data or file that may, for example, be spread out in various storage areas but whose portions are related may be backed up and restored using the principles, techniques and arrangements of the invention. Moreover, the size of the file is also not particularly important, though the process of backing up or restoring large files benefits from more time savings provided by the invention, as compared to small files. Also, the invention is not limited to being implemented on any specific hardware of software platform. As such, the invention may be useful in small computer systems having only a few local tape and disk devices, as well as in large mainframe systems having massive data storage systems and many tape drives.

Likewise, if only one disk drive or storage device stores the different data portions of the file and/or there is only one tape drive to receive the data portion for backup storage, the system and principles of the invention still may apply. Thus, the criteria checking in step 381 of FIG. 6 may be optional in an alternative embodiment. However, as explained above, there may be significant overhead involved in concurrently transferring multiple streams of data from the same storage device from or to the same tape device (in a scenario where there may be multiple data portions of a file on a single disk, or where there may only be one tape device to perform the backup or restore). However, as hardware systems such as storage devices and backup devices evolve with advancing technology, such overhead problems may be overcome. For example, tape drive may evolve to accommodate the ability to write multiple streams to different tracks on a single tape. As such, the principles of the invention relating to dividing the single file into multiple data portions and concurrently transferring such data portions to or from a data storage device still apply and may serve a valuable purpose in systems having only singular storage and backup devices such as one disk or one tape device that can receive and read and/or write multiple streams at the same time.

While this invention has been particularly shown and described with references to preferred embodiments thereof, it will be understood by those skilled in the art that various changes in form and details may be made therein without departing from the spirit and scope of the invention as defined by the appended claims. The foregoing description of embodiments of the invention are not intended to be limiting. Rather, any limitations to the invention are presented in the following claims.

What is claimed is:

1. A method for backing up a file comprising the steps of:
    determining which respective data portions of the file are stored upon which respective storage devices of a plurality of storage devices;
    designating individual respective backup devices of a plurality of backup devices to be used for backing-up respective individual ones of the data portions of the file that are stored on respective storage devices, the data portions stored on each of the respective storage devices being designated to be backed up to corresponding respective backup devices; and
    concurrently backing-up at least two respective data portions of the file to different respective backup devices for which those data portions are designated, such that the at least two respective data portions of the file are backed-up to respective backup devices in parallel.

2. The method of claim 1, wherein the step of determining includes the steps of:
    obtaining an identity of a volume that stores the respective data portions of the file;
    obtaining, from the volume, disk extent information for each respective data portion of the file, the disk extent information identifying, for each respective data portion, a respective storage device that stores the data portion and a size and placement of the data portion on the storage device; and
    creating a list of backup work items, each backup work item in the list corresponding to one of the respective data portions of the file to be backed-up and including the disk extent information for that respective data portion.

3. The method of claim 2, wherein the step of creating a list of backup work items includes the steps of:
    assigning a unique respective backup file name for each respective data portion of the file to be backed up; and
    associating the disk extent information for each respective data portion of the file to be backed up to the unique respective backup file name assigned to that respective data portion.

4. The method of claim 2, wherein the step of designating further includes the step of:
    sequentially selecting and assigning backup work items from the list of backup work items to a backup device sequentially selected from the plurality of backup devices, wherein backup work items corresponding to data portions that reside on a common storage device are assigned to the same backup device.

5. The method of claim 4, wherein the step of sequentially selecting and assigning backup work items to a backup device includes the step of:
    determining if a data portion corresponding to a currently selected backup work item is stored on the same storage device as a backup work item that has been previously selected and assigned to a backup device, and if so, assigning the currently selected backup work item to the same backup device as the backup work item previously; and
    wherein the step of designating further includes the step of:
        repeating the steps of sequentially selecting and assigning and determining in a round-robin manner until all backup work items have been assigned to a specific respective backup device.

6. The method of claim 4, wherein the step of concurrently backing-up at least two respective data portions of the file to different respective backup devices concurrently backs up a plurality of data portions of the file in parallel to a plurality of respectively assigned backup devices, while ensuring that no two data portions that exist on a common storage device are backed up in parallel at the same time.

7. The method of claim 4, further including the step of:
    detecting if a tuning file is available which specifies which data portions are to be backed-up to which backup devices, and if so, using assignments between backup work items and backup devices as specified in the tuning file, and if not, performing the steps of sequentially selecting and assigning and determining until all backup work items have been assigned to a respective backup device.

8. The method of claim 1, wherein the step of designating includes the step of:
    assigning respective data portions of the file that are stored on different storage devices to different respective backup devices, such that during the step of concurrently backing-up the at least two respective data portions of the file, no two data portions that reside on a common storage device are read at the same time and such that data portions that reside on different.

9. The method of claim 1, wherein the step of concurrently backing-up the at least two respective data portions of the file concurrently backs up a plurality of data portions of the file in parallel to a plurality of respectively assigned backup devices, such that no two data portions that exist on a common storage device are backed up in parallel.

10. The method of claim 1, wherein the step of concurrently backing-up includes the steps of:
concurrently performing, for each respective backup device having at least one designated data portion to backup, a backup operation of one data portion designated to be backed-up by that backup device; and
detecting completion of the backup operation of each respective backup device and determining if other designated data portions remain to be backed up, and if so, repeating the steps of concurrently performing a backup operation and detecting completion of the backup operation for any remaining designated data portions that remain to be backed up.

11. The method of claim 1, wherein the step of concurrently backing-up includes the steps of:
receiving a first stream of data from a first data portion of the file stored within a first data storage device within the data storage system;
writing the first stream of data to a first respective backup device for which the first data portion is designated;
receiving a second stream of data from a second data portion of the file stored within a second data storage device within the data storage system;
writing the second stream of data to a second respective backup device for which the second data portion is designated; and
wherein the steps of receiving the first stream of data and receiving the second stream of data are performed concurrently such that different respective data portions of the file are simultaneously received and written as input to different backup devices in the data backup system.

12. The method of claim 1, further comprising the step of:
detecting if the file to be backed-up meets predetermined criteria which indicate that a multiple trail file backup is to be performed, and if so, performing the steps of determining, designating and concurrently backing-up.

13. The method of claim 12, further comprising the step of:
intercepting a list of files to be backed up by the backup server and performing the step of detecting for each file within the list of files.

14. The method of claim 12, wherein the predetermined threshold is an amount of time required to completely backup the file using a non-multiple trail file backup method.

15. The method of claim 12, wherein the predetermined criteria is that the file exceeds a minimum size threshold.

16. A method of preparing a list of backup work items for a backup server, the list containing a list of files to be backed-up, the method comprising the steps of:
retrieving a list of files to be backed up; and
for each single file in the list of files, determining if the single file exceeds a predetermined size threshold, and if so, determining if the single file meets criteria for a multiple trail file backup, and if so, performing the steps of:
obtaining an identity of a volume that stores respective data portions of the file;
obtaining, from the volume, disk extent information for each respective data portion of the file, the disk extent information identifying, for each respective data portion, a respective storage device that stores the data portion and a size and placement of the data portion on the storage device; and
creating a list of backup work items, each backup work item in the list corresponding to one of the respective data portions of the file to be backed-up and including the disk extent information for that respective data portion, such that each data portion of the file is treated as a separate work item during a backup process and such that the data portions stored on each of the respective storage devices are designated to be backed up to corresponding respective backup devices.

17. A method of providing data from a data storage system to a backup server, the method comprising the steps of:
providing, as output from the data storage system, a first stream of data from a first portion of a file stored on a first data storage device within the data storage system;
providing, as output from the data storage system, a second stream of data from a second portion of the file stored on a second data storage device within the data storage system, the data stored on each of the respective storage devices being designated to be backed up to corresponding respective backup devices; and
wherein the steps of providing a first stream of data and providing a second stream of data are performed concurrently between a backup client program and a backup server program such that different respective data portions of the file are simultaneously provided as output from the data storage system to the backup server.

18. A method for restoring a file comprising the steps of:
determining which respective data portions of the file are stored upon which respective backup devices of a plurality of backup devices;
designating individual respective portions of storage devices of a plurality of storage devices to be used for storing respective individual ones of the data portions of the file that are stored on respective backup devices, the data portions stored on each of the respective backup devices being designated to be restored to corresponding respective storage devices; and
concurrently restoring at least two respective data portions of the file to different respective storage devices for which those data portions are designated, such that the at least two respective data portions of the file are restored to respective storage devices from respective backup devices in parallel.

19. The method of claim 18, wherein the step of determining further includes the step of:
obtaining catalog information for the file produced as a result of a backup operation formerly performed on the file, the catalog information indicating which data portions of the file from which storage devices were backed up to which backup devices.

20. The method of claim 19, wherein the step of designating further includes the steps of:
querying a volume to which the file is to be restored for restore space layout information indicating the portions of the storage devices that are available within the volume to receive the individual ones of the data portions of the file to be restored;
determining the type of volume to which the data portion are to be restored; and
ensuring that the type of volume and the restore space layout information are compatible to accept the individual ones of the data portions of the file to be restored.

21. A backup server computer system comprising:
a backup client interface;
a backup device interface coupled to a plurality of backup devices;
a processor;
an interconnection mechanism coupled to the backup client interface, the storage device interface and the processor; and
a memory coupled to the interconnection mechanism, the memory storing a backup server program, the backup server program being executable on the processor to cause the processor to:
  (i) determine which respective data portions of a file to be backed-up are stored upon which respective storage devices of a plurality of storage devices accessible by a host backup client;
  (ii) designate individual respective backup devices of the plurality of backup devices to be used for backing-up respective individual ones of the data portions of the file that are stored on respective storage devices, the data portions stored on each of the respective storage devices being designated to be backed up to corresponding respective backup devices; and
  (iii) concurrently back-up at least two respective data portions of the file to different respective backup devices for which those data portions are designated, such that the at least two respective data portions of the file are backed-up to respective backup devices in parallel via the backup server computer system.

22. A backup server computer system comprising:
a backup client interface coupled to a host backup client, the host backup client having access to a plurality of storage devices;
a backup device interface coupled to a plurality of backup devices;
a processor;
an interconnection mechanism coupled to the backup client interface, the backup device interface and the processor; and
a memory coupled to the interconnection mechanism, the memory storing a backup server program, the backup server program being executable on the processor to cause the processor to:
  (i) determine which respective data portions of a file are stored upon which respective backup devices of the plurality of backup devices;
  (ii) designate individual respective portions of storage devices of the plurality of storage devices accessible via the host backup client to be used for storing respective individual ones of the data portions of the file that are stored on respective backup devices, the data portions stored on each of the respective backup devices being designated to be restored to corresponding respective storage devices; and
  (iii) concurrently restore at least two respective data portions of the file to different respective storage devices for which those data portions are designated, such that the at least two respective data portions of the file are restored to respective storage devices accessible to the host backup client from respective backup devices interfaced to the backup server in parallel.

23. A backup server comprising:
a plurality of storage devices;
a backup client interface to couple the backup server to at least one host backup client; and
a processor coupled to the plurality of storage devices and to the backup client interface, the processor executing a series of instructions to allow the backup server to backup a single file that is stored as a plurality of data portions across a plurality of storage devices accessible to the host backup client, each data portion being backed up as a stream of data to a respective backup device and at least two streams of data being received for backup in parallel to the backup server from the host backup client, the data portions stored on each of the respective storage devices being designated to be backed up to corresponding respective backup devices.

24. A computer program product having a computer-readable medium including computer program logic encoded thereon as a backup server program for backing up a file, such that the computer program logic, when executed on at least one processing unit with a backup server, causes the at least one processing unit to perform the steps of:
  determining which respective data portions of the file are stored upon which respective storage devices of a plurality of storage devices;
  designating individual respective backup devices of a plurality of backup devices to be used for backing-up respective individual ones of the data portions of the file that are stored on respective storage devices, the data portions stored on each of the respective storage devices being designated to be backed up to corresponding respective backup devices; and
  concurrently backing-up at least two respective data portions of the file to different respective backup devices for which those data portions are designated, such that the at least two respective data portions of the file are backed-up to respective backup devices in parallel.

25. A computer program product having a computer-readable medium including computer program logic encoded thereon for preparing a list of backup work items for a backup server, such that the computer program logic, when executed on at least one processing unit with a backup server, causes the at least one processing unit to perform the steps of:
  retrieving a list of files to be backed up; and
  for each single file in the list of files, determining if the single file exceeds a predetermined size threshold, and if so, determining if the single file meets criteria for a multiple trail file backup, and if so, performing the steps of:
    obtaining an identity of a volume that stores respective data portions of the file;
    obtaining, from the volume, disk extent information for each respective data portion of the file, the disk extent information identifying, for each respective data portion, a respective storage device that stores the data portion and a size and placement of the data portion on the storage device; and
    creating a list of backup work items, each backup work item in the list corresponding to one of the respective data portions of the file to be backed-up and including the disk extent information for that respective data portion, such that each data portion of the file is treated as a separate work item during a backup process and such that the data portions stored on each of the respective storage devices are designated to be backed up to corresponding respective backup devices.

26. A computer program product having a computer-readable medium including computer program logic encoded thereon for providing data from a data storage system to a backup server, such that the computer program logic, when executed on at least one processing unit with a host backup client interfaced to the data storage system, causes the at least one processing unit to perform the steps of:

providing, as output from the data storage system, a first stream of data from a first portion of a file stored on a first data storage device within the data storage system;

providing, as output from the data storage system, a second stream of data from a second portion of the file stored on a second data storage device within the data storage system, the data stored on each of the respective storage devices being designated to be backed up to corresponding respective backup devices; and wherein the steps of providing the first stream of data and providing the second stream of data are performed concurrently such that different respective data portions of the file are simultaneously provided as output from the data storage system to the backup server by the processor of the host backup client.

27. A computer program product having a computer-readable medium including computer program logic encoded thereon as a backup server program for restoring a file, such that the computer program logic, when executed on at least one processing unit with a backup server, causes the at least one processing unit to perform the steps of:

determining which respective data portions of the file are stored upon which respective backup devices of a plurality of backup devices;

designating individual respective portions of storage devices of a plurality of storage devices to be used for storing respective individual ones of the data portions of the file that are stored on respective backup devices, the data portions stored on each of the respective backup devices being designated to be restored from corresponding respective storage devices; and concurrently restoring at least two respective data portions of the file to different respective storage devices for which those data portions are designated, such that the at least two respective data portions of the file are restored to respective storage devices from respective backup devices in parallel.

28. A method of transferring a file stored across a first set of storage devices to a second set of storage devices, the method comprising the steps of:

determining distinct portions of the file that are stored on the first set of storage devices;

designating each of the distinct portions of the file as unique work items to be transferred independently in relation to other distinct portions of the file designated as other work items, the portions of the file stored on each of the respective storage devices being designated to be backed up to corresponding respective backup devices; and concurrently transferring from the first set of storage devices to the second set of storage devices, at least two distinct portions of the file as unique work items, such that at least two distinct portions of the file are transferred in parallel from the first set of storage devices to the second set of storage devices thus minimizing an amount of time required to transfer the file between from the first set of storage devices to the second set of storage devices.

\* \* \* \* \*